United States Patent
Nishihara et al.

(10) Patent No.: US 11,866,551 B2
(45) Date of Patent: Jan. 9, 2024

(54) POLYMER COMPOSITION

(71) Applicants: NISSAN CHEMICAL CORPORATION, Tokyo (JP); KYUSHU UNIVERSITY, NATIONAL UNIVERSITY CORPORATION, Fukuoka (JP)

(72) Inventors: Masamichi Nishihara, Fukuoka (JP); Shiyan Feng, Fukuoka (JP); Byungchan Hwang, Fukuoka (JP); Liana Christiani, Fukuoka (JP); Kazunari Sasaki, Funabashi (JP); Shoichi Kondo, Funabashi (JP); Taichi Nakazawa, Funabashi (JP); Takamasa Kikuchi, Funabashi (JP)

(73) Assignees: NISSAN CHEMICAL CORPORATION, Tokyo (JP); KYUSHU UNIVERSITY, NATIONAL UNIVERSITY CORPORATION, Fukuoka (JP)

( * ) Notice: Subject to any disclaimer, the term of this patent is extended or adjusted under 35 U.S.C. 154(b) by 822 days.

(21) Appl. No.: 16/967,180

(22) PCT Filed: Feb. 8, 2019

(86) PCT No.: PCT/JP2019/004564
§ 371 (c)(1),
(2) Date: Aug. 4, 2020

(87) PCT Pub. No.: WO2019/156204
PCT Pub. Date: Aug. 15, 2019

(65) Prior Publication Data
US 2021/0047464 A1    Feb. 18, 2021

(30) Foreign Application Priority Data

Feb. 9, 2018    (JP) .................................. 2018-022183

(51) Int. Cl.
*C08G 65/338*    (2006.01)
*C08G 73/10*    (2006.01)
(Continued)

(52) U.S. Cl.
CPC ....... *C08G 65/338* (2013.01); *C08G 73/1007* (2013.01); *C08G 73/1039* (2013.01);
(Continued)

(58) Field of Classification Search
None
See application file for complete search history.

(56) References Cited

U.S. PATENT DOCUMENTS

2010/0129552 A1\*    5/2010    Mengel .............. C08G 73/1071
427/256
2013/0247990 A1†    9/2013    Facchetti et al.
(Continued)

FOREIGN PATENT DOCUMENTS

JP    9-324126 A    † 12/1997
JP    11-119432 A    †  4/1999
(Continued)

OTHER PUBLICATIONS

Christiani et al., "Development of Charge-Transfer Complex Hybrid Films as Polymer Electrolyte Membrane for High Temperature PEFC Operation," Macromol. Chem. Phys. (2016), vol. 217, pp. 654-663.†

(Continued)

*Primary Examiner* — Rachel Kahn
(74) *Attorney, Agent, or Firm* — Birch, Stewart, Kolasch & Birch, LLP

(57) ABSTRACT

The present invention provides a composition containing an electron-donating polymer (D) and an electron-withdrawing polymer (A), wherein the electron-donating polymer (D) has
(Continued)

a constitutional unit represented by the following formula (1a), $Y^{1a}$ in the following formula (1a) is a divalent group represented by the following formula (3a), and the electron-withdrawing polymer (A) has a constitutional unit represented by the following formula (4a):

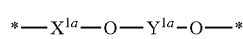

(1a)

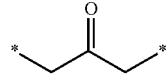

(3a)

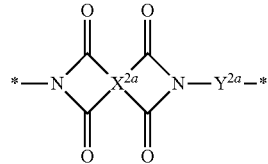

(4a)

wherein the symbols in the formulas are as described in the DESCRIPTION.

10 Claims, 3 Drawing Sheets

(51) Int. Cl.
*C08L 79/08* (2006.01)
*C08L 71/00* (2006.01)
*C08G 65/40* (2006.01)

(52) U.S. Cl.
CPC ..... *C08G 73/1042* (2013.01); *C08G 73/1064* (2013.01); *C08G 73/1067* (2013.01); *C08L 71/00* (2013.01); *C08L 79/08* (2013.01); *C08G 65/4012* (2013.01)

(56) References Cited

U.S. PATENT DOCUMENTS

| | | |
|---|---|---|
| 2013/0247991 A1 † | 9/2013 | Facchetti et al. |
| 2013/0247992 A1 † | 9/2013 | Drees et al. |
| 2013/0248831 A1 † | 9/2013 | Pan et al. |
| 2015/0171332 A1 † | 6/2015 | Drees et al. |
| 2016/0072070 A1 † | 3/2016 | Drees et al. |
| 2020/0040137 A1 † | 2/2020 | Nishihara et al. |

FOREIGN PATENT DOCUMENTS

| | | | |
|---|---|---|---|
| JP | 2011-68872 A † | 4/2011 |
| JP | 2015-518649 A † | 7/2015 |
| WO | WO 2007/108118 A1 † | 9/2007 |
| WO | WO 2013/142841 A1 † | 9/2013 |
| WO | WO 2018/066546 A1 † | 4/2018 |

OTHER PUBLICATIONS

Christiani et al., "Evaluation of Proton Conductivity of Sulfonated Polyimide/Dihydroxy Naphthalene Charge-Transfer Complex Hybrid Membranes," Journal of Polymer Science, Part A: Polymer Chemistry (2014), vol. 52, pp. 2991-2997.†

Feng et al., "Development of polymer-polymer type charge-transfer blend membranes for fuel cell application," Journal of Membrane Science (2018), vol. 548, pp. 223-231.†

Nishihara et al., "Experimental and Theoretical Study of Charge-Transfer Complex Hybrid Polyimide Membranes," Journal of Polymer Science, Part B: Polymer Physics (2014), vol. 52, pp. 293-298.†

Okamoto et al., "Anomalous dielectric response in tetrathiafulvalene-p-chloranil as observed in temperature- and pressure-induced neutral-to-ionic phase transition," Physical Review B (Apr. 1991, vol. 43, No. 10, pp. 8224-8232.†

Watari et al., "Preparation of novel polyimide hybrid materials by multi-layered charge-transfer complex formation," Polymer Journal (2013), vol. 45, pp. 839-844.†

\* cited by examiner
† cited by third party

POLYMER COMPOSITION

TECHNICAL FIELD

The present invention relates to a composition containing an electron-donating polymer and an electron-withdrawing polymer.

BACKGROUND ART

Many materials that form charge-transfer complexes have been reported. For example, non-patent document 1 reports a charge-transfer complex using tetrathiafulvalene-p-chloranil and a derivative thereof. As polymer materials that form charge-transfer complexes, for example, non-patent documents 2 and 3 report a charge-transfer complex of a polymer, polyimide, and a low-molecular-weight compound dihydroxynaphthalene. In addition, non-patent document 4 reports a charge-transfer complex of an electron withdrawing polymer and an electron-donating polymer.

DOCUMENT LIST

Non-Patent Documents non-patent document 1: Phys. Rev. B 43 (1991) 8224
non-patent document 2: Polymer Journal (2013) 45, 839-844
non-patent document 3: JOURNAL OF POLYMER SCIENCE, PART A POLYMER CHEMISTRY 2014, 52, 2991-2997
non-patent document 4: JOURNAL OF MEMBRANE SCIENCE 2018, 548, 223-231

SUMMARY OF INVENTION

Technical Problem

As reported in non-patent document 4, if a charge-transfer complex can be formed, it is expected that phase separation between an electron-donating polymer and an electron-withdrawing polymer is suppressed, and a material (polymer composition) with improved strength is obtained. The present invention has been made by noting such situation and aims to provide a composition of an electron-donating polymer and an electron-withdrawing polymer with a high formation amount of a charge-transfer complex.

Solution to Problem

The present invention capable of achieving the above-mentioned purpose is as follows.

[1] A composition comprising an electron-donating polymer (D) and an electron-withdrawing polymer (A), wherein the electron-donating polymer (D) has a constitutional unit represented by the formula (1a):

$$*-X^{1a}-O-Y^{1a}-O-* \quad (1a)$$

wherein $X^{1a}$ is a divalent group represented by the formula (2a) or the formula (2b):

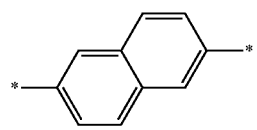
(2a)

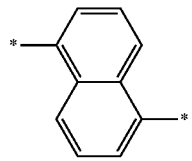
(2b)

wherein * is a bonding position, $Y^{1a}$ is a divalent group represented by the formula (3a):

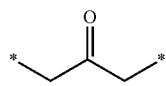
(3a)

wherein * is a bonding position, and
* is a bonding position, and the electron-withdrawing polymer (A) has a constitutional unit represented by the formula (4a):

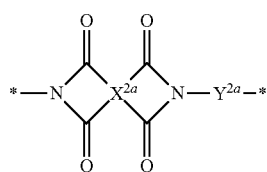
(4a)

wherein $X^{2a}$ is a tetravalent group represented by any of the formula (5a) to the formula (5c):

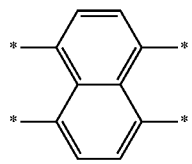
(5a)

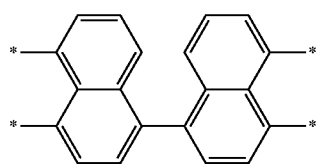
(5b)

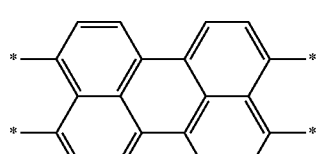
(5c)

wherein * is a bonding position, $Y^{2a}$ is a divalent group represented by any of the formula (6a) to the formula (9a):

$$*-\!\!\underset{(R^{1a})_{n1}}{\underline{\phantom{XX}}}\!\!-* \tag{6a}$$

$$*-\!\!\underset{(R^{2a})_{n2}}{\underline{\phantom{XX}}}\!\!-Z^{1a}-\!\!\underset{(R^{3a})_{n3}}{\underline{\phantom{XX}}}\!\!-* \tag{7a}$$

$$*-\!\!\underset{(R^{4a})_{n4}}{\underline{\phantom{XX}}}\!\!-Z^{2a}-\!\!\underset{(R^{5a})_{n5}}{\underline{\phantom{XX}}}\!\!-Z^{3a}-\!\!\underset{(R^{6a})_{n6}}{\underline{\phantom{XX}}}\!\!-* \tag{8a}$$

$$*-\!\!\underset{(R^{7a})_{n7}}{\underline{\phantom{XX}}}\!\!-Z^{4a}-\!\!\underset{(R^{8a})_{n8}}{\underline{\phantom{XX}}}\!\!-Z^{5a}-\!\!\underset{(R^{9a})_{n9}}{\underline{\phantom{XX}}}\!\!-Z^{6a}-\!\!\underset{(R^{10a})_{n10}}{\underline{\phantom{XX}}}\!\!-* \tag{9a}$$

wherein n1 is an integer of 1-4, n2-n10 are each independently an integer of 0-4, $R^{1a}$-$R^{10a}$ are each independently a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a sulfo group, a phenyl group optionally substituted by $W^{1a}$, a thienyl group optionally substituted by $W^{1a}$, or a furyl group optionally substituted by $W^{1a}$, $W^{1a}$ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, or a sulfo group, when n1 to n10 are each an integer of 2 to 4, plural $R^{1a}$ to $R^{10a}$ are optionally the same as or different from each other, at least one of $R^{1a}$ in the number of n1 is a sulfo group, at least one selected from the group consisting of $R^{2a}$ in the number of n2 and $R^{3a}$ in the number of n3 is a sulfo group, at least one selected from the group consisting of $R^{4a}$ in the number of n4, $R^{5a}$ in the number of n5 and $R^{6a}$ in the number of n6 is a sulfo group, at least one selected from the group consisting of $R^{7a}$ in the number of n7, $R^{ea}$ in the number of n8, $R^{9a}$ in the number of n9 and $R^{10a}$ in the number of n10 is a sulfo group, $Z^{1a}$-$Z^{6a}$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, *—C($R^{11a}$)($R^{12a}$)—*, or an oxy group, $R^{11a}$ and $R^{12a}$ are each independently a $C_{1-3}$ alkyl group optionally substituted by a halogen atom, or $R^{11a}$ and $R^{12a}$ are bonded to each other to form a $C_{3-6}$ hydrocarbon ring together with a carbon atom bonded thereto, and

* is a bonding position, and

* is a bonding position.

[2] The composition of the aforementioned [1], wherein $X^{1a}$ is a divalent group represented by the formula (2a).

[3] The composition of the aforementioned [1] or [2], wherein the electron-donating polymer (D) further has a constitutional unit represented by the formula (1b):

$$*-\!O-\!X^{1b}-\!O-\!Y^{1b}-\!* \tag{1b}$$

wherein $X^{1b}$ is a divalent group represented by the formula (2a) or the formula (2b):

$$\text{(2a) naphthalene-2,6-diyl} \tag{2a}$$

$$\text{(2b) naphthalene-1,5-diyl} \tag{2b}$$

wherein * is a bonding position, $Y^{1b}$ is a divalent group represented by the formula (3b):

$$*-\!CH_2-\!CH(OH)-\!CH_2-\!* \tag{3b}$$

wherein * is a bonding position, and

* is a bonding position.

[4] The composition of the aforementioned [3], wherein $X^{1b}$ is a divalent group represented by the formula (2a).

[5] The composition of the aforementioned [3] or [4], wherein an amount of the constitutional unit represented by the formula (1a) is 80-98 mol per 100 mol of the total of the constitutional unit represented by the formula (1a) and the constitutional unit represented by and the formula (1b).

[6] The composition of any one of the aforementioned [1] to [5], wherein $R^{1a}$-$R^{10a}$ are each independently a $C_{1-10}$ alkyl group optionally substituted by a halogen atom, a $C_{1-10}$ alkoxy group optionally substituted by a halogen atom, a halogen atom, a nitro group, a formyl group, a cyano group, a sulfo group, a phenyl group optionally substituted by $W^{1a}$, a thienyl group optionally substituted by $W^{1a}$, or a furyl group optionally substituted by $W^{1a}$, and $W^{1a}$ is a $C_{1-10}$ alkyl group optionally substituted by a halogen atom, a $C_{1-10}$ alkoxy group optionally substituted by a halogen atom, a halogen atom, a nitro group, a formyl group, a cyano group or a sulfo group.

[7] The composition of any one of the aforementioned [1] to [6], wherein $X^{2a}$ is a tetravalent group represented by the formula (5a).

[8] The composition of any one of the aforementioned [1] to [7], wherein $Y^{ea}$ is a divalent group represented by the formula (7a).

[9] The composition of any one of the aforementioned [1] to [5], wherein the constitutional unit represented by the formula (4a) is a constitutional unit represented by the formula (4a-1):

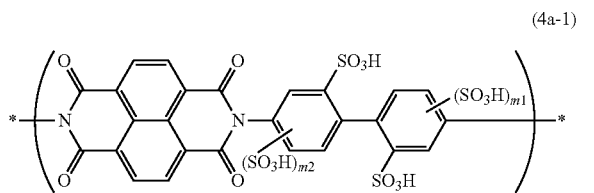

(4a-1)

wherein m1 and m2 are each independently an integer of 0-3, and
* is a bonding position.

[10] The composition of any one of the aforementioned [1] to [9], wherein the electron-donating polymer (D) and the electron-withdrawing polymer (A) form a charge-transfer complex.

Advantageous Effects of Invention

According to the present invention, a composition of an electron-donating polymer and an electron-withdrawing polymer with a high formation amount of a charge-transfer complex is obtained.

DESCRIPTION OF EMBODIMENTS

Figure 1:
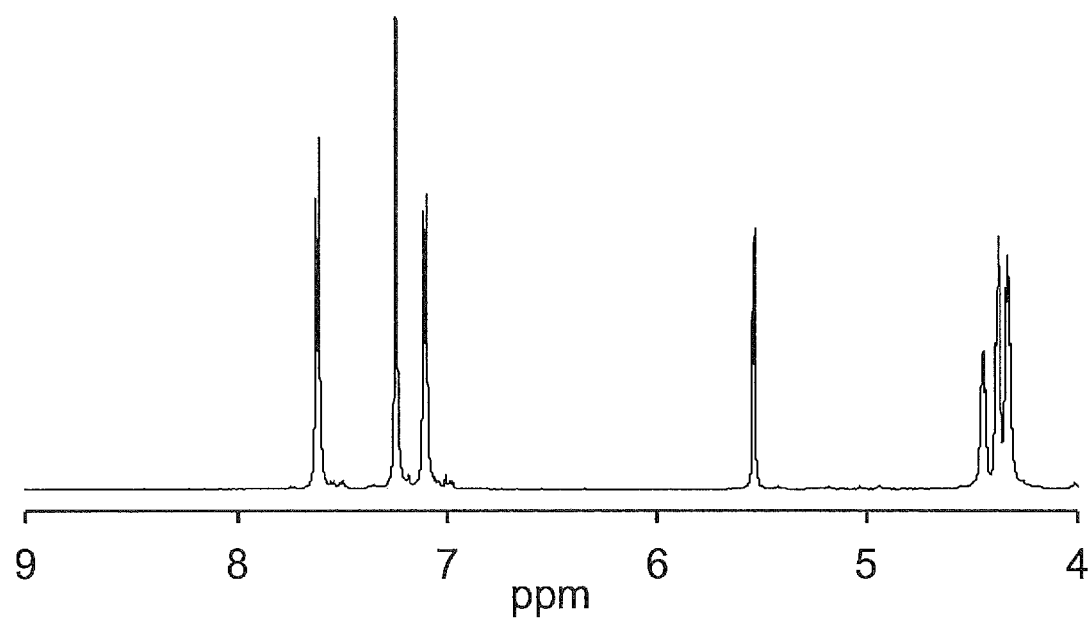
FIG. 1 is a $^1$H NMR chart of electron-donating polymer (d-1) obtained in Synthetic Example 2.

The present invention is explained sequentially in the following. The following examples and preferable descriptions can be combined as long as they do not contradict each other.

The composition of the present invention contains an electron-donating polymer (D) and an electron-withdrawing polymer (A). Only one kind of the electron-donating polymer (D) may be used, or two or more kinds thereof may be used in combination. Similarly, only one kind of the electron-withdrawing polymer (A) may be used, or two or more kinds thereof may be used in combination. As used herein, the "electron-donating" means property of a molecule or ion that can easily give electron to other molecule or ion. In addition, the "electron-withdrawing" means the property of a molecule or ion that can easily receive electron from other molecule or ion.

The electron-donating polymer (D) in the composition of the present invention has a constitutional unit represented by the formula (1a):

$$*—X^{1a}—O—Y^{1a}—O—*$$ (1a)

wherein $X^{1a}$ is a divalent group represented by the formula (2a) or the formula (2b):

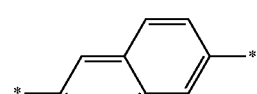

(2a)

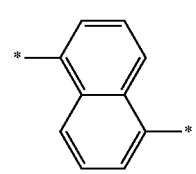

(2b)

wherein * is a bonding position, $Y^{1a}$ is a divalent group represented by the formula (3a):

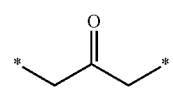

(3a)

wherein * is a bonding position, and
* is a bonding position. In the following, the "constitutional unit represented by the formula (1a)" is sometimes abbreviated as "constitutional unit (1a)". The constitutional unit and group represented by other formulas are sometimes abbreviated in the same manner. It is considered that the structure of —$X^{1a}$—O— in the constitutional unit (1a) imparts an electron donating property to the polymer (D).

$X^{1a}$ in the electron-donating polymer (D) may include both the divalent group (2a) and the divalent group (2b), or one of these. $X^{1a}$ is preferably a divalent group (2a). The constitutional unit (1a) is preferably a constitutional unit represented by the following formula (1a-1):

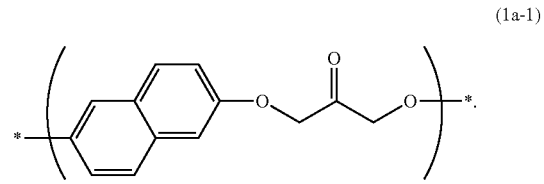

(1a-1)

The electron-donating polymer (D) optionally further has a constitutional unit represented by the formula (1b):

$$*—O—X^{1b}—O—Y^{1b}—*$$ (1b)

wherein $X^{1b}$ is a divalent group represented by the formula (2a) or the formula (2b):

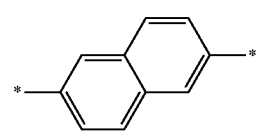

(2a)

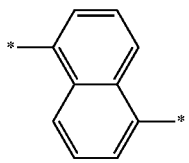

(2b)

wherein * is a bonding position,
$Y^{1b}$ is a divalent group represented by the formula (3b):

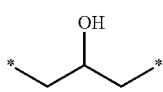

(3b)

wherein * is a bonding position, and
* is a bonding position. The structure of —$X^{1b}$—O— in the constitutional unit (1b) is also considered to impart electron-donating property to polymer (D), like the structure of —$X^{1a}$—O— in the constitutional unit (1a).

$X^{1b}$ in the electron-donating polymer (D) may include both the divalent group (2a) and the divalent group (2b), or one of these. $X^1$ is preferably a divalent group (2a). The constitutional unit (1b) is preferably a constitutional unit represented by the following formula (1b-1):

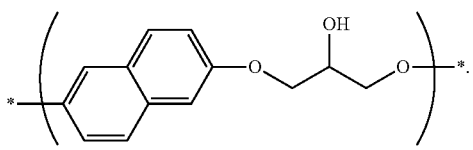

(1b-1)

The electron-donating polymer (D) is preferably a copolymer containing both the constitutional unit (1a) and the constitutional unit (1b), more preferably a random copolymer. The amount of the constitutional unit (1a) in this copolymer is preferably 80-99 mol, more preferably 95-98 mol, per 100 mol of the total of the constitutional unit (1a) and the constitutional unit (1b). The amount of the constitutional unit (1a) can be calculated from the value of the chemical shift of the proton nuclear magnetic resonance ($^1$H NMR) of the polymer and the integrated intensity.

The weight-average molecular weight (Mw) of the electron-donating polymer (D) is preferably 5,000 to 800,000, more preferably 8,000 to 500,000, further preferably 10,000 to 100,000. Mw can be measured by gel permeation chromatography (GPC) with polystyrene as the standard, as described in the below-mentioned Examples. Mw of other polymers can also be measured similarly.

The electron-donating polymer (D) can be synthesized by a known reaction using a commercially available product as a starting material. The commercially available product is available from, for example, Tokyo Chemical Industry Co., Ltd., FUJIFILM Wako Pure Chemical Corporation and the like. For example, an electron-donating polymer (d) having a divalent group (3b) having a hydroxy group (precursor of electron-donating polymer (D)) is produced by reacting a divalent compound having epoxy groups (e.g., 2,6-bis(oxiran-2-ylmethoxy)naphthalene) with a divalent compound having hydroxy groups (e.g., 2,6-dihydroxynaphthalene), and the electron-donating polymer (D) having a divalent group (3a) having an oxo group can be produced by oxidizing the precursor, as described in the below-mentioned Synthetic Examples.

The reaction of a divalent compound having epoxy groups and a divalent compound having hydroxy groups to produce the electron-donating polymer (d) is generally performed in a solvent. As the solvent, ketone solvents can be mentioned. Examples thereof include cyclohexanone, acetone, methyl ethyl ketone, methyl isobutyl ketone, diisobutyl ketone and the like. Preferred is cyclohexanone or acetone. The amount of the solvent is preferably 0.5 to 50 L, more preferably 1 to 10 L, per 1 mol of a divalent compound having epoxy groups.

A catalyst may be used for the aforementioned reaction. Examples of the catalyst include phosphines and imidazoles. Examples of the phosphines include triphenylphosphine, tris(2,6-dimethoxyphenyl)phosphine and the like. Examples of the imidazoles include 2-methylimidazole and the like. Among these, tris(2,6-dimethoxyphenyl)phosphine is preferable. When a catalyst is used, the amount thereof is preferably 0.0001 to 0.1 mmol, more preferably 0.001 to 0.015 mmol, per 1 mol of a divalent compound having epoxy groups.

The reaction temperature of the aforementioned reaction is preferably 50 to 200° C., more preferably 100 to 180° C. When the reaction temperature is higher than the boiling point of the solvent, the reaction may be performed in a sealed tube. The reaction time is preferably 20 to 200 hr, more preferably 30 to 100 hr.

After the aforementioned reaction, electron-donating polymer (d) can be obtained by a known means such as precipitation, collection by filtration, drying and the like.

The oxidation of the hydroxy group of the electron-donating polymer (d) to an oxo group can be performed using an addition compound of sulfur trioxide and a base. Examples of the aforementioned compound include pyridine-sulfur trioxide complex, triethylamine-sulfur trioxide complex and the like. Both the pyridine-sulfur trioxide complex and the triethylamine-sulfur trioxide complex are commercially available from, for example, Tokyo Chemical Industry Co., Ltd. The amount of the aforementioned compound is preferably 0.5-10 mol, more preferably 1-3 mol, per 1 mol of the hydroxy group in the electron-donating polymer (d).

It is preferable to use triethylamine for the oxidation of the electron-donating polymer (d) by a pyridine-sulfur trioxide complex. The amount of trimethylamine is preferably 2-10 mol, more preferably 4-8 mol, per 1 mol of the hydroxy group in the electron-donating polymer (d).

The aforementioned oxidation is generally performed in a solvent. The solvent is not particularly limited as long as it does not inhibit progress of the reaction. Examples thereof include dimethyl sulfoxide, dichloromethane, chloroform, chlorobenzene, dichlorobenzene, diethyl ether, 1,2-dimethoxyethane, 1,4-dioxane and the like. Among these, dimethyl sulfoxide or dichloromethane is preferable. Only one kind of the solvent may be used, or two or more kinds may be used in combination.

The temperature of the aforementioned oxidation is preferably −30° C.; to 80° C., more preferably −10° C. to 50° C., and the time thereof is preferably 1 to 24 hr, more preferably 6 to 18 hr.

After the aforementioned oxidation, electron-donating polymer (D) can be obtained by a known means such as precipitation, collection by filtration, drying and the like.

The electron-withdrawing polymer (A) in the composition of the present invention has a constitutional unit represented by the formula (4a):

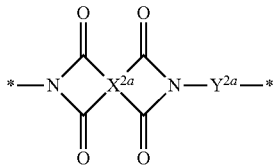
(4a)

wherein $X^{2a}$ is a tetravalent group represented by any of the formula (5a) to the formula (5c):

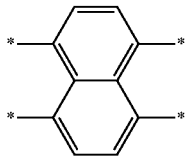
(5a)

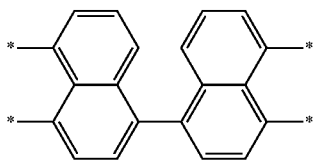
(5b)

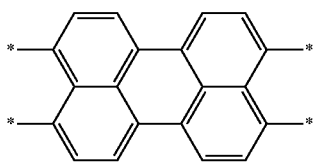
(5c)

wherein * is a bonding position, $Y^{2a}$ is a divalent group represented by any of the formula (6a) to the formula (9a):

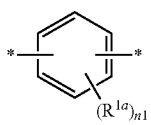
(6a)

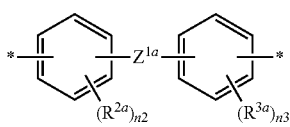
(7a)

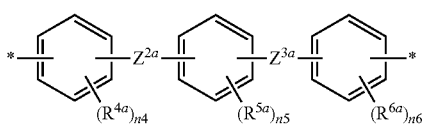
(8a)

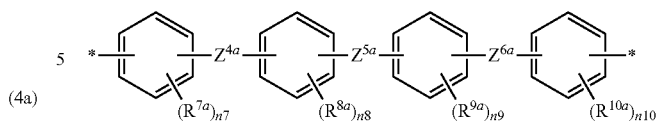
(9a)

wherein n1 is an integer of 1-4, n2-n10 are each independently an integer of 0-4, $R^{1a}$-$R^{10a}$ are each independently a $C_{1-40}$ alkyl group optionally substituted by a halogen atom, a $C_{1-10}$ alkoxy group optionally substituted by a halogen atom, a hydroxy group, a halogen atom, a nitro group, a formyl group, a cyano group, a sulfo group, a phenyl group optionally substituted by $W^{1a}$, a thienyl group optionally substituted by $W^{1a}$, or a furyl group optionally substituted by $W^{1a}$, $W^{1a}$ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, or a sulfo group, when n1 to n10 are each an integer of 2 to 4, plural $R^{1a}$ to $R^{10a}$ are optionally the same as or different from each other, at least one of $R^{1a}$ in the number of n1 is a sulfo group, at least one selected from the group consisting of $R^{2a}$ in the number of n2 and $R^{3a}$ in the number of n3 is a sulfo group, at least one selected from the group consisting of $R^{4a}$ in the number of n4, $R^{5a}$ in the number of n5 and $R^{6a}$ in the number of n6 is a sulfo group, at least one selected from the group consisting of $R^{7a}$ in the number of n7, $R^{8a}$ in the number of n8, $R^{9a}$ in the number of n9 and $R^{12a}$ in the number of n10 is a sulfo group, $Z^{1a}$-$Z^{6a}$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, *—C($R^{11a}$)($R^{12a}$)—*, or an oxy group, $R^{11a}$ and $R^{12a}$ are each independently a $C_{1-3}$ alkyl group optionally substituted by a halogen atom, or $R^{11a}$ and $R^{12a}$ are bonded to each other to form a $C_{3-6}$ hydrocarbon ring together with a carbon atom bonded thereto, and

* is a bonding position, and

* is a bonding position. The imide structure in the constitutional unit (4a) is considered to impart electron-withdrawing property to polymer (A).

The composition of the present invention has ion exchange capacity caused by the sulfo group in the electron-withdrawing polymer (A). Using the aforementioned electron-donating polymer (D) in the present invention, a decrease in the ion exchange capacity of the composition can be suppressed even if it is heat-treated.

In the above-mentioned formula, when n2 is 0, $R^{2a}$ is absent. When n2 is an integer of 2 to 4, plural $R^{2a}$ are optionally the same as or different from each other. The same applies to other groups. The definitions of groups are sequentially explained below.

In the present specification, Examples of the halogen atom include fluorine, chlorine, bromine, iodine.

In the present specification, examples of the $C_{1-3}$ alkyl group include methyl group, ethyl group, propyl group, isopropyl group.

In the present specification, examples of the $C_{1-10}$ alkyl group include methyl group, ethyl group, propyl group, isopropyl group, butyl group, isobutyl group, sec-butyl group, tert-butyl group, pentyl group, isopentyl group, neopentyl group, tert-pentyl group, hexyl group, heptyl group, octyl group, nonyl group, decyl group.

In the present specification, examples of the $C_{1-10}$ alkoxy group include methoxy group, ethoxy group, propoxy group, isopropoxy group, butoxy group, isobutoxy group, sec-butoxy group, tert-butoxy group, pentyloxy group, isopentyl oxy group, neopentyl oxy group, tert-pentyloxy group, hexyloxy group, heptyloxy group, octyloxy group, nonyloxy group, decyloxy group.

In the present specification, the $C_{1-2}$ alkylene group is a methylene group or an ethylene group.

In the present specification, examples of the $C_{3-10}$ alkylene group include trimethylene group, 1-methylethylene group, tetramethylene group, 1-methyltrimethylene group, 1,1-dimethylethylene group, pentamethylene group, 1-methyltetramethylene group, 2-methyltetramethylene group, 1,1-dimethyltrimethylene group, 1,2-dimethyltrimethylene group, 2,2-dimethyltrimethylene group, 1-ethyltrimethylene group, hexamethylene group, 1-methylpentamethylene group, 2-methylpentamethylene group, 3-methylpentamethylene group, 1,1-dimethyltetramethylene group, 1,2-dimethyltetramethylene group, 2,2-dimethyltetramethylene group, 1-ethyltetramethylene group, 1,1,2-trimethyltrimethylene group, 1,2,2-trimethyltrimethylene group, 1-ethyl-1-methyltrimethylene group, and 1-ethyl-2-methyltrimethylene group.

In the present specification, examples of the $C_{3-6}$ hydrocarbon ring include cyclopropane ring, cyclobutane ring, cyclopentane ring, and cyclohexane ring.

In the divalent group (7a), it is preferred that n2 and n3 are each independently an integer of 1-4, at least one of $R^{2a}$ in the number of n2 is a sulfo group, and at least one of $R^{3a}$ in the number of n3 is a sulfo group.

In divalent group (8a), it is preferred that n4-n6 are each independently an integer of 1-4, at least one of $R^{4a}$ in the number of n4 is a sulfo group, at least one of $R^{5a}$ in the number of n5 is a sulfo group, and at least one of $R^{6a}$ in the number of n6 is a sulfo group.

In divalent group (9a), it is preferred that n7-n10 are each independently an integer of 1-4, at least one of $R^{7a}$ in the number of n7 is a sulfo group, at least one of $R^{8a}$ in the number of n8 is a sulfo group, at least one of $R^{9a}$ in the number of n9 is a sulfo group, and at least one of $R^{10a}$ in the number of n10 is a sulfo group.

It is preferred that $R^{1a}$-$R^{10a}$ are each independently a $C_{1-10}$ alkyl group optionally substituted by a halogen atom, a $C_{1-10}$ alkoxy group optionally substituted by a halogen atom, a halogen atom, a nitro group, a formyl group, a cyano group, a sulfo group, a phenyl group optionally substituted by $W^{1a}$, a thienyl group optionally substituted by $W^{a}$, or a furyl group optionally substituted by $W^{1a}$, and $W^{1a}$ is a $C_{1-10}$ alkyl group optionally substituted by a halogen atom, a $C_{1-10}$ alkoxy group optionally substituted by a halogen atom, a halogen atom, a nitro group, a formyl group, a cyano group or a sulfo group.

$X^{2a}$ is preferably a tetravalent group (5a). $Y^{2a}$ is preferably a divalent group (7a). The constitutional unit (4a) is preferably a constitutional unit represented by the formula (4a-1):

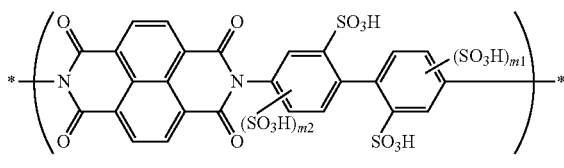

(4a-1)

wherein m1 and m2 are each independently an integer of 0-3, and

* is a bonding position. Both m1 and m2 are preferably 0.

The electron-withdrawing polymer (A) may be a polymer composed of one kind of constitutional unit (4a), or a polymer composed of two or more kinds of constitutional units (4a). The electron-withdrawing polymer (A) may be a polymer composed of one or more kinds of constitutional units (4a) and one or more kinds of other constitutional units (i.e., constitutional unit different from constitutional unit (4a)).

Examples of the other constitutional unit include a constitutional unit represented by the formula (4b):

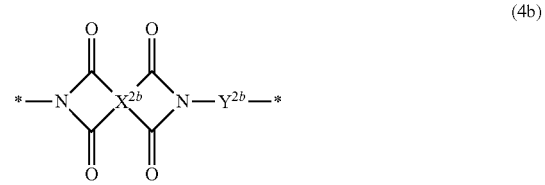

(4b)

wherein $X^{2b}$ is a tetravalent group represented by any of the formula (5a) to the formula (5c):

(5a)

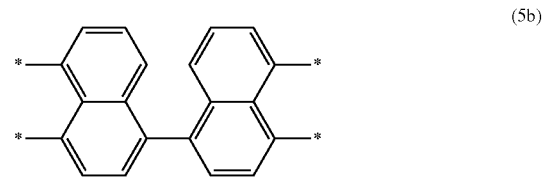

(5b)

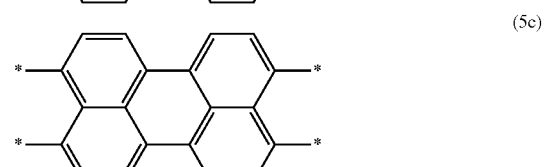

(5c)

wherein * is a bonding position, $Y^{2b}$ is a divalent group represented by any of the formula (6b) to the formula (9b):

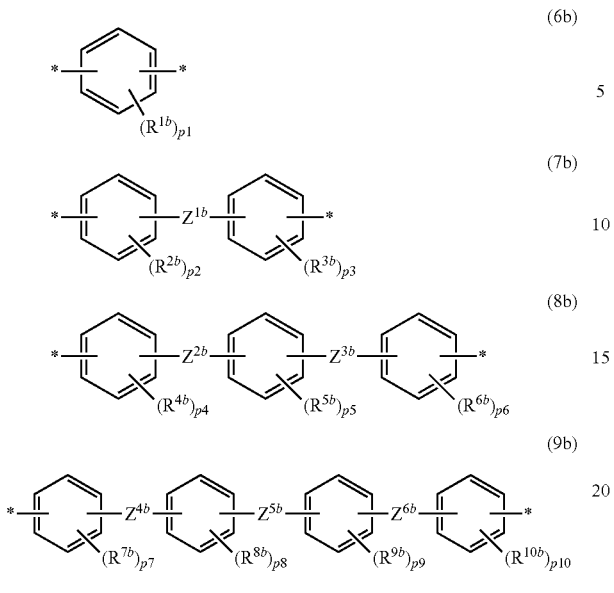

(6b)
(7b)
(8b)
(9b)

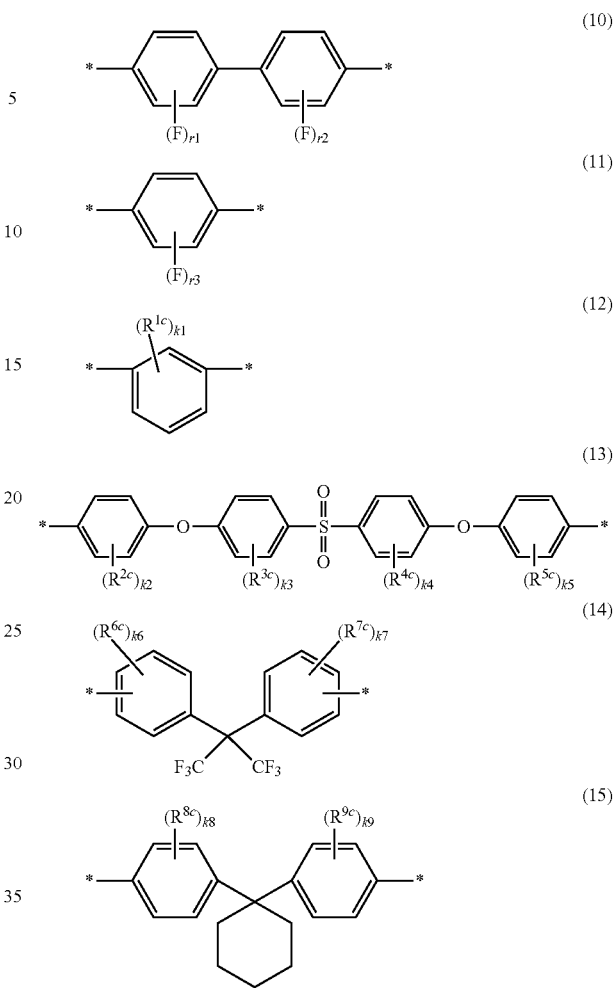

(10)
(11)
(12)
(13)
(14)
(15)

wherein p1-p10 are each independently an integer of 0-4, $R^{1b}$-$R^{10b}$ are each independently a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a phenyl group optionally substituted by $W^{1b}$, a thienyl group optionally substituted by $W^{1b}$, or a furyl group optionally substituted by $W^{1b}$, $W^{1b}$ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, or a cyano group, when p1-p10 are each an integer of 2 to 4, plural $R^{1b}$-$R^{10b}$ are optionally the same as or different from each other, $Z^{1b}$-$Z^{6b}$ are each independently a single bond, a $C_{1-2}$ alkylene group optionally substituted by a halogen atom, a $C_{3-10}$ alkylene group, a sulfonyl group, a carbonyl group, *—CONH—*, *—NHCO—*, *—C($R^{11b}$)($R^{12b}$)—*, or an oxy group, $R^{11b}$ and $R^{12b}$ are each independently a $C_{1-3}$ alkyl group optionally substituted by a halogen atom, or $R^{11b}$ and $R^{12b}$ are bonded to each other to form a $C_{3-6}$ hydrocarbon ring together with a carbon atom bonded thereto, and

* is a bonding position, and

* is a bonding position.

It is preferred that $R^{1b}$-$R^{10b}$ are each independently a $C_{1-10}$ alkyl group optionally substituted by a halogen atom, a $C_{1-10}$ alkoxy group optionally substituted by a halogen atom, a halogen atom, a nitro group, a formyl group, a cyano group, a phenyl group optionally substituted by $W^{1b}$, a thienyl group optionally substituted by $W^{1b}$, or a furyl group optionally substituted by $W^{1b}$, and $W^{1b}$ is a $C_{1-10}$ alkyl group optionally substituted by a halogen atom, a $C_{1-10}$ alkoxy group optionally substituted by a halogen atom, a halogen atom, a nitro group, a formyl group or a cyano group.

$X^{2b}$ is preferably a tetravalent group (5a). $Y^{2b}$ is preferably a divalent group represented by any of the formula (10) to the formula (15):

wherein r1-r3 are each independently an integer of 1-4, k1 is an integer of 1-4, $R^{1c}$ is a fluorine atom or a trifluoromethyl group, and when k1 is an integer of 2 to 4, plural $R^{1c}$ are optionally the same as or different from each other, k2-k5 are each independently an integer of 0-4, $R^{2c}$ is a nitro group or a trifluoromethyl group, and when k2 is an integer of 2 to 4, plural $R^{2c}$ are optionally the same as or different from each other, $R^{1c}$ and $R^{4c}$ are both chlorine atoms, $R^{5c}$ is a nitro group or a trifluoromethyl group, and when k5 is an integer of 2 to 4, plural $R^{5c}$ are optionally the same as or different from each other, k6 and k7 are each independently an integer of 0-4, $R^{6c}$ is a $C_{1-3}$ alkyl group optionally substituted by a halogen atom, and when k6 is an integer of 2 to 4, plural $R^{6c}$ are optionally the same as or different from each other, $R^{7c}$ is a $C_{1-3}$ alkyl group optionally substituted by a halogen atom, and when k7 is an integer of 2 to 4, plural $R^{7c}$ are optionally the same as or different from each other, k8 and k9 are each independently an integer of 0-4, $R^{8c}$ is a $C_{1-3}$ alkyl group optionally substituted by a halogen atom, and when k8 is an integer of 2 to 4, plural $R^{8c}$ are optionally the same as or different from each other, $R^{9c}$ is a $C_{1-3}$ alkyl group optionally substituted by a halogen atom, and when k9 is an integer of 2 to 4, plural $R^{9c}$ are optionally the same as or different from each other, and

* is a bonding position.

Examples of preferable constitutional unit (4b) include constitutional units represented by the following formula (4b-1) to the formula (4b-7) (wherein the groups are as described above):

The amount of the constitutional unit (4a) in the electron-withdrawing polymer (A) is 80-100 mol, more preferably 90-100 mol, per 100 mol of the total of the constitutional unit (4a) and other constitutional unit (e.g., constitutional (4b-1)
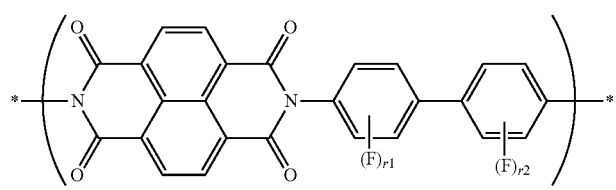

(4b-2)
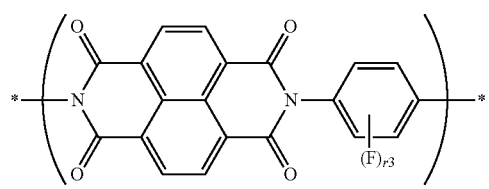

(4b-3)
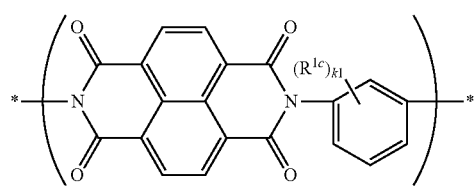

(4b-4)
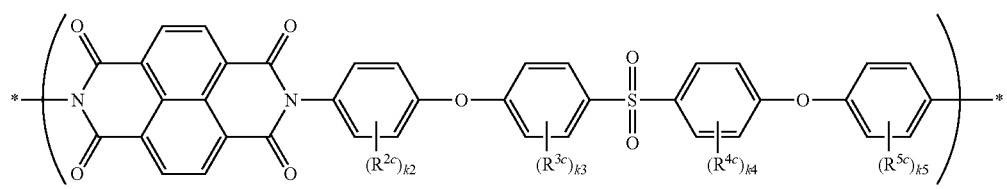

(4b-5)
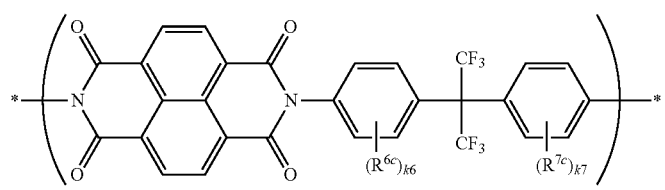

(4b-6)

(4b-7)
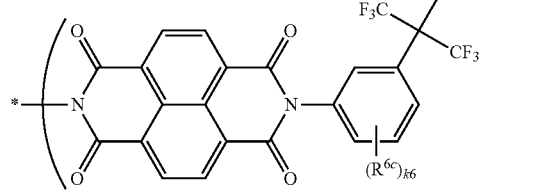

unit (4b)). The electron-withdrawing polymer (A) is more preferably a polymer composed of one or more constitutional units (4a), further preferably a polymer composed of one kind of constitutional unit (4a), particularly preferably a polymer composed of one kind of constitutional unit (4a-1).

The weight-average molecular weight (Mw) of the electron-withdrawing polymer (A) is preferably 5,000 to 1,000,000, more preferably 8,000 to 900,000, further preferably 10,000 to 150,000.

The electron-withdrawing polymer (A) can be synthesized by a known reaction using a commercially available product as a starting material. Commercially available products are available from, for example, Tokyo Chemical Industry Co., Ltd., FUJIFILM Wako Pure Chemical Corporation, and the like. For example, electron-withdrawing polymer (A1) can be produced by reacting tetracarboxylic dianhydride (e.g., naphthalene-1,4,5,8-tetracarboxylic dianhydride) with diamine (e.g., 4,4'-diamino-2,2'-biphenyldisulfonic acid), as described in the below-mentioned Synthetic Examples. In addition, a compound obtained by introducing a substituent into a commercially available product by a known reaction may also be used as a starting material.

The aforementioned electron-withdrawing polymer can be synthesized, for example, according to the method described in Macromolecules, 2002, 35, 9022-9028, Macromol. Chem. Phys. 2016, 217, 654-663, or Journal of Polymer Science: Part A: Polymer Chemistry, Vol. 41, 3901-3907 (2003).

The amount of tetracarboxylic dianhydride in the aforementioned reaction is preferably 0.98 to 1.02 mol, more preferably 0.99 to 1.01 mol, per 1 mol of diamine.

The production method of electron-withdrawing polymer (A1) includes a dissolution step, a polymerization step and, as necessary, a modification step.

The dissolution step is a step of dissolving diamine in an organic solvent by heating a mixture of diamine (0.1 mM to 5 M), tertiary amine (0.1 mM to 20 M), and an organic solvent. Tertiary amine is used to dissolve diamine having an acidic group in an organic solvent. While the temperature of heating the mixture is not particularly limited, diamine can be easily dissolved uniformly in a solvent at around 20 to 160° C.

The tertiary amine is not particularly limited, and examples thereof include trimethylamine, triethylamine, tripropylamine, N-ethyl-N-methylbutylamine, tributylamine, N,N-dimethylbenzylamine, N,N-diethylbenzylamine, tribenzylamine, diazabicycloundecene and the like. Among these, triethylamine is preferable. Only one kind of these tertiary amines may be used, or two or more kinds thereof may be used in combination.

As the organic solvent, one having high boiling point and high polarity is preferable. Examples thereof include phenol, m-cresol, m-chlorophenol, p-chlorophenol, dimethylformamide, dimethylacetamide, dimethyl sulfoxide, N-methyl-2-pyrrolidinone, N-cyclohexyl-2-pyrrolidinone and the like. Among these, m-cresol, dimethyl sulfoxide and N-methyl-2-pyrrolidinone are preferable. Only one kind of these organic solvents may be used, or two or more kinds thereof may be used in combination.

In the present specification, "m-" shows "meta" and "p-" shows "para".

The polymerization step is a step of adding tetracarboxylic dianhydride (0.1 mM to 5 M) to a solution of diamine obtained in the dissolution step, and polymerizing the obtained mixture by heating in the presence of an organic acid (0.01 mM to 20 M). The organic acid acts as a catalyst for polymerization and ring-closing reaction and promotes production of polyamic acid and formation of an imide ring by the ring-closing reaction thereof.

As the organic acid, a compound having a high boiling point and highly soluble in the above-mentioned organic solvent is preferable. Examples thereof include benzoic acid, methylbenzoic acid, dimethylbenzoic acid, salicylic acid and the like. Among these, benzoic acid is preferable. The organic acid only needs to be present in the polymerization step, and may be added in the above-mentioned dissolution step. While the amount of the organic acid to be added is not particularly limited, when benzoic acid is used as the organic acid, the amount thereof is preferably about 1-6 mol per 1 mol of tetracarboxylic dianhydride. The temperature of heating the reaction mixture is at least not less than 40° C. By setting the temperature to preferably 100 to 190° C., more preferably 140 to 180° C., the polymerization reaction efficiently proceeds, and a high-molecular-weight electron-withdrawing polymer, polyimide, can be obtained.

The modification step is a step of modifying structural defects in the polyimide obtained in the polymerization step. The structural defect refers to a defect based on the unclosing part (amic acid) in polyimide. In the modification step, the reaction mixture after the polymerization step is further heated at a temperature higher than the temperature of the polymerization step to perform a dehydration reaction, whereby the unclosing part is imidated. The temperature is at least preferably not less than 150° C., more preferably 190 to 220° C. The ring-closing reaction efficiently proceeds in this modification step, and polyimide free of structural defect can be obtained.

After the aforementioned step, electron-withdrawing polymer (A) can be obtained by a known means such as precipitation, collection by filtration, dialysis, drying and the like.

The amount of electron-donating polymer (D) in the composition of the present invention is preferably 1 to 10,000 parts by weight, more preferably 10 to 1,500 parts by weight, further preferably 20 to 900 parts by weight, most preferably 50 to 500 parts by weight, per 100 parts by weight of electron-withdrawing polymer (A).

In the composition of the present invention, it is preferred that electron-donating polymer (D) and electron-withdrawing polymer (A) form a charge-transfer complex. As a result, a composition in which electron-donating polymer (D) and electron-withdrawing polymer (A) are sufficiently mixed, and phase separation is suppressed can be obtained.

As used herein, the "charge-transfer complex" means an intermolecular compound formed by two kinds of neutral molecules by charge-transfer force. That the electron-donating polymer (D) and the electron-withdrawing polymer (A) form a charge-transfer complex can be confirmed from the fact that the UV-vis absorption spectrum of the composition has a peak or shoulder around 530 nm, as described in Nature, 375(6529), 303-305 (1995) and Polym. J. (2013), 45, 839-844.

To increase the amount of a charge-transfer complex formed, the composition of the present invention is preferably heat-treated. The heat treatment is preferably performed under inert gas (e.g., nitrogen, argon) atmosphere. The temperature of the heat treatment is preferably 40 to 200° C., more preferably 60 to 180° C., further preferably 70 to 160° C., and the time thereof is preferably 0.01 to 200 hr, more preferably 0.5 to 160 hr, further preferably 1 to 80 hr.

A solution of the composition of the present invention is prepared, and the solvent is evaporated from this solution, whereby the membrane can be produced. A method for preparing the solution of the composition of the present invention is not particularly limited. For example, electron-donating polymer (D) and electron-withdrawing polymer (A) are successively or simultaneously added to a solvent, and the mixture is appropriately heated to prepare a solution of the composition. Alternatively, a solution of electron-donating polymer (D) and a solution of electron-withdrawing polymer (A) are separately prepared, and the obtained solutions are mixed to prepare a solution of the composition.

Examples of the solvent for preparing a solution of the composition include water, methanol, ethanol, trifluoroethanol, 1-propanol, 2-propanol, 2-methyl-2-butanol, ethylene glycol, benzyl alcohol, cyclohexane, benzene, nitrobenzene, chloroform, carbon tetrachloride, diethyl ether, tetrahydrofuran, isoxazole, 1,4-dioxane, cyclopentyl methyl ether, acetone, acetonitrile, nitromethane, dimethyl sulfoxide, N,N-dimethylformamide, sulfolane, and 1,3-propanesultone. Only one kind of these solvents may be used, or two or more kinds thereof may be used in combination. Among these, methanol, ethanol, 1-propanol, 2-propanol, ethylene glycol, benzyl alcohol, cyclohexane, benzene, nitrobenzene, chloroform, carbon tetrachloride, diethyl ether, tetrahydrofuran, 1,4-dioxane, cyclopentyl methyl ether, acetone, acetonitrile, nitromethane, dimethyl sulfoxide, N,N-dimethylformamide, sulfolane, and 1,3-propanesultone are preferable, methanol, ethanol, 1-propanol, 2-propanol, ethylene glycol, and dimethyl sulfoxide are more preferable, and dimethyl sulfoxide is further preferable.

In the solution containing electron-donating polymer (D) and electron-withdrawing polymer (A), the total concentration of the electron-donating polymer (D) and electron-withdrawing polymer (A) is preferably 0.1 to 90 wt %, more preferably 0.5 to 10 wt %, based on the whole solution.

A method for evaporating a solvent from a solution of the composition is not particularly limited, and a solvent may be evaporated by a known means (e.g., drying by heating, drying under reduced pressure etc.). The thickness of the membrane can be adjusted by the amounts of electron-donating polymer (D) and electron-withdrawing polymer (A) to be charged, and the area of petri dish used for evaporating the solvent. The thickness of the membrane produced from the composition of the present invention is preferably 0.01 to 200 μm, more preferably 0.1 to 100 μm, further preferably 0.3 to 60 μm.

Evaporation of a solvent from a solution of the composition may be performed under air atmosphere or inert gas (e.g., nitrogen, argon) atmosphere. The solvent may be evaporated under normal pressure or under reduced pressure using vacuum dryer, vacuum pump and the like.

The temperature of evaporation of a solvent is preferably −10 to 200° C., more preferably 40 to 160° C., further preferably 50 to 130° C. Evaporation of the solvent may be performed at a constant temperature, or by changing the temperature in multiple steps. The time of evaporation of a solvent is preferably 0.5 to 300 hr, more preferably 1 to 160 hr, further preferably 2 to 150 hr.

The conditions for producing a membrane from the composition of the present invention (e.g., kind of the aforementioned solvent, concentration of polymer in the solution, and atmosphere, pressure, temperature and time of solvent evaporation) can be selected as appropriate.

A membrane of the composition of the present invention obtained as mentioned above is preferably subjected to a heat treatment. The heat treatment can increase the amount of a charge-transfer complex formed in the membrane. The heat treatment is preferably performed under inert gas (e.g., nitrogen, argon) atmosphere. The temperature of the heat treatment is preferably 40 to 200° C., more preferably 60 to 180° C., further preferably 70 to 160° C., and the time thereof is preferably 0.01 to 200 hr, more preferably 0.5 to 160 hr, further preferably 1 to 80 hr.

The membrane produced from the composition of the present invention (i.e., membrane containing the composition of the present invention) can be used for various applications. Examples of the application of the membrane containing the composition of the present invention include electrolyte membrane of fuel cell, electrolyte coated membrane on electrode catalyst in catalyst layer, gas-permeation-suppressing membrane and the like. Among these, electrolyte membrane of fuel cell or electrolyte coated membrane on electrode catalyst in catalyst layer is preferable, and electrolyte membrane of fuel cell is more preferable. The electrolyte-coated membrane on the electrode catalyst is a membrane having a constitution in which an electrode catalyst and an electrode are coated with a polymer electrolyte used for forming a catalyst layer. The catalyst layer can be formed from, for example, a catalyst ink including electrode catalysts and polymer electrolytes.

The thickness of the electrolyte membrane of a fuel cell containing the composition of the present invention is preferably 0.1 to 200 μm, more preferably 2 to 50 μm, further preferably 5 to 20 μm. The thickness of the electrolyte coated membrane on the electrode catalyst in the catalyst layer of a fuel cell containing the composition of the present invention is preferably 1 to 100 nm, more preferably 2 to 50 nm, further preferably 5 to 30 nm.

EXAMPLE

While the Synthetic Examples and Examples of the present invention are explained in more detail in the following, the present invention is not limited by them. The analysis apparatuses and conditions therefor used in the Synthetic Examples and Examples are as follows.

$^1$H NMR:

The chemical shift value of proton nuclear magnetic resonance ($^1$H NMR) of polymer was measured in a deuterodimethyl sulfoxide (DMSO-$d_6$) solvent using AV-400 (400 MHz) manufactured by Bruker or AVANCE III (500 MHz) manufactured by Bruker. The chemical shift was shown by the δ value (ppm) when tetramethylsilane was the internal standard (0.0 ppm). In the description of the NMR spectrum, "s" means singlet, "brs" means broad singlet, "d" means doublet, "t" means triplet, "dd" means double doublet, "m" means multiplet, "br" means broad, "J" means coupling constant, and "Hz" means hertz.

"DMSO-$d_6$" means deuterodimethyl sulfoxide.

GPC:

The weight-average molecular weight (Mw) and number-average molecular weight (Mn) of polymer were measured by gel permeation chromatography (GPC) under analysis condition A, and converted using the calibration curve of standard polystyrene.

<Analysis Condition A> column: guard column (Tosoh TSK guard column Super AW-H), manufactured by Tosoh Corporation, column (Tosoh TSK gel super AW 3000) and column (Tosoh TSK gel super AW 5000) manufactured by Tosoh Corporation were connected in tandem in this order and used, column temperature: 40° C.

detector: difference refractive index detector RI-2031 and ultraviolet-visible detector UV-2075 manufactured by JASCO Corporation eluent: dimethyl sulfoxide with 10 mmol/L sodium nitrate dissolved therein UV-Vis:

The measurement of ultraviolet-visible spectroscopy (UV-vis) of a composition was performed using ultraviolet visible near infrared spectrophotometer V-650 manufactured by JASCO Corporation provided with integrating sphere unit ISV-722 manufactured by JASCO Corporation and sample holder SSH-506 manufactured by JASCO Corporation.

Ion Exchange Capacity (Mmol/g):

The theoretical ion exchange capacity (theoretical IEC) was calculated as an amount of sulfo group (mmol) contained in a polymer or composition (1 g), The ion exchange capacity (IEC) by titration was calculated as follows. First, a membrane of a polymer or composition cut into a size of 1×1 cm$^2$ was immersed in 10 mL of an aqueous sodium chloride solution (concentration: 15 wt %) for 3 days, and then titration was performed using an aqueous sodium hydroxide solution (concentration: 0.001 mol/L) and phenolphthalein as an indicator until the pH of the aqueous sodium chloride solution reached 7. From the amount of the aqueous sodium hydroxide solution used to reach pH 7, and the ion exchange capacity (IEC) by titration was calculated by the following formula:

Ion exchange capacity (IEC) (mmol/g) by titration=
[amount of aqueous sodium hydroxide solution used to reach pH 7 (L)]×[concentration of aqueous sodium hydroxide solution (mol/L)]×[1/1000]/
[dry weight of membrane (g)]

Power Generation Test of Fuel Cell:

A membrane electrode assembly (hereinafter to be abbreviated as "MEA") was prepared from electrolyte membrane, gas diffusion layer (hereinafter to be abbreviated as "GDL") and catalyst ink. As the electrolyte membrane, a membrane of the composition of the present invention or Nafion 212 (registered trade mark, manufactured by Du Pont, purchased from TOYO Corporation, membrane thickness: 50 μm) was used. As GDL, hydrophobic carbon paper (manufactured by Toray Industries, product name "EC-TP1-060T") or hydrophobic carbon paper (manufactured by SIGRACET, product name "GDL 24 BCH") with a micro porous layer was used.

<MEA Preparation Condition A>

The catalyst ink was prepared using an electrode catalyst of platinum-supporting carbon (manufactured by Tanaka Kikinzoku Kogyo K.K., platinum content: 46.2 wt %, product name "TEC10E50E"), deionized water, ethanol (manufactured by FUJIFILM Wako Pure Chemical Corporation), and Nafion dispersion solution (manufactured by FUJIFILM Wako Pure Chemical Corporation, product name "5% Nafion Dispersion Solution DE521 CS type"). An electrode catalyst, deionized water, ethanol, and Nafion dispersion solution were added in this order to a glass vial, and the obtained dispersion solution was exposed to ultrasonic waves set to an output of 40% for 30 min using ultrasonication homogenizer Smurt NR-50M manufactured by MICROTEC CO., LTD. to prepare catalyst ink. As the electrolyte membrane, a membrane of the composition of the present invention was used. As GDL, hydrophobic carbon paper (manufactured by Toray Industries, Inc., product name "EC-TP1-060T") was used. The catalyst ink was applied to both surfaces of the electrolyte membrane by using a spray coater V8H manufactured by Nordson Corporation such that the amount of platinum was 0.3 mg per 1 cm$^2$ of the applied surface, and dried to form a catalyst layer. Then, the electrolyte membrane having catalyst layers formed on both surfaces was thermocompression bonded under the conditions of 132° C., 0.3 kN, 180 sec to prepare a catalyst coated membrane (hereinafter to be abbreviated as "CCM"), and a gas diffusion layers (GDL) were thermocompression bonded to the obtained both surfaces of CCM under the conditions of 132° C., 0.6 kN, 20 sec to prepare MEA having a three-layer structure of GDL/CCM/GDL.

<MEA Preparation Condition B>

The catalyst ink was prepared using an electrode catalyst (manufactured by Tanaka Kikinzoku Kogyo K.K., platinum content: 46.5 wt %, product name "TEC10E50E") serving as a platinum-supporting carbon, deionized water, ethanol (manufactured by FUJIFILM Wako Pure Chemical Corporation), and the composition of the present invention. The composition of the present invention, an electrode catalyst, deionized water and ethanol were added in this order to a glass vial, and exposed to ultrasonication under conditions similar to MEA preparation condition A to prepare catalyst ink. As the electrolyte membrane, Nafion 212 (registered trade mark, manufactured by Du Pont, purchased from TOYO Corporation, membrane thickness: 50 μm) was used. As GDL, hydrophobic carbon paper (manufactured by SIGRACET, product name "GDL 24 BCH") with a micro porous layer was used. The catalyst ink was applied to both surfaces of the electrolyte membrane by using a spray coater V8H manufactured by Nordson Corporation such that the amount of platinum was 0.3 mg per 1 cm$^2$ of the applied surface, and dried to form a catalyst layer. Then, the electrolyte membrane having a catalyst layer formed on both surfaces was thermocompression bonded under the conditions of 132° C., 0.3 kN, 180 sec to prepare a catalyst coated membrane (CCM), and a gas diffusion layers (GDL) were thermocompression bonded to the both surfaces of the obtained CCM under the conditions of 132° C., 0.6 kN, 20 sec to prepare MEA having a three-layer structure of GDL/CCM/GDL. Under MEA preparation condition B, as a polymer electrolyte to prepare catalyst ink, the composition of the present invention was used instead of Nafion, and a catalyst layer containing the composition of the present invention was formed.

The proportion of the polymer electrolyte in the catalyst ink in the aforementioned MEA preparation conditions A and B is explained. For preparation of the catalyst ink, the proportion (wt %) of the polymer electrolyte calculated from the following formula was set to 28 wt %.

Proportion of polymer electrolyte (wt %)=[solid content (weight) of polymer electrolyte/[solid content (weight) of electrode catalyst (weight)+polymer electrolyte]]×100

To be specific, when the polymer electrolyte is Nafion, the amount of the electrode catalyst was set to 100.0 mg, the amount of the Nafion dispersion solution was set to 837 μL, the amount of deionized water was set to 0.6 mL, and the amount of ethanol was set to 5.1 mL. The solid content of Nafion in the Nafion dispersion solution (837 μL) was 38.9 mg. When the polymer electrolyte is the composition of the present invention, the amount of the electrode catalyst was set to 100.0 mg, the amount of the composition of the present invention was set to 38.9 mg, the amount of deionized water was set to 0.6 mL, and the amount of ethanol was set to 5.1 mL.

The prepared MEA was placed on a single cell (manufactured by FC Development Co., Ltd., JARI standard cell) having a 1 cm$^2$ electrode area, and cell ageing at 0.6 V was performed for 4 hr. A power generation test of fuel cell was performed using a fuel cell test system (manufactured by TOYO Corporation, AutoPEM), and current density and voltage were measured. Also, cell resistance value and open-circuit voltage (hereinafter to be abbreviated as "OCV") were measured using SI 1287 electrochemical interface impedance analyzer manufactured by Solartron (hereinafter to be abbreviated as "OCV") were measured. OCV is an electric potential when no voltage or electric current is applied to a single cell.

The power generation test of fuel cell was performed under the following test conditions A and B.

<Test Condition A>
temperature: 80° C.
relative humidity: 95%
fuel supply:
anode side: hydrogen was supplied at a flow of 100 mL/min
cathode side: air was supplied at a flow of 100 mL/min
<test condition B>
temperature: 110° C.
relative humidity: 31%,
fuel supply:
anode side: hydrogen was supplied at a flow of 100 mL/min
cathode side: air was supplied at a flow of 100 mL/min Synthetic Example 1: Synthesis of 2,6-bis(oxiran-2-ylmethoxy) naphthalene A refluxing condenser and a dropping funnel were mounted on a reaction container, and 2,6-dihydroxynaphthalene (7.36 g, 46.0 mmol), acetone (55 mL) and water (10 mL) were successively added to the reaction container. Then, the reaction mixture was heated to 65° C. and epichlorohydrin (28.8 mL, 368.0 mmol) was added with stirring. Potassium hydroxide (5.16 g, 91.9 mmol) dissolved in a mixed solvent of acetone (20 mL) and water (45 mL) was added dropwise to the reaction mixture with a dropping funnel over 2 hr and the mixture was reacted by stirring for 12 hr. After completion of the reaction, a precipitate from the solvent was collected by filtration, and the precipitate was washed with water to give the object compound as a white solid (6.7 g, yield 54%).

Synthetic Example 2: Synthesis of Electron-Donating Polymer (d-1)

After purging the inside of a reaction container with nitrogen, 2,6-bis(oxiran-2-ylmethoxy)naphthalene (1.246 g, 4.58 mmol), 2,6-dihydroxynaphthalene (0.733 g, 4.58 mmol), tris(2,6-dimethoxyphenyl)phosphine (16.2 mg, 36.6 µmol) and cyclohexanone (15 mL) were successively added to the reaction container. Then, the reaction mixture was stirred at 140° C. for 12 hr, dimethyl sulfoxide (10 mL) was added and the mixture was further stirred at 160° C. for 40 hr. After completion of the reaction, the reaction mixture was added dropwise to chloroform to allow for precipitation, and the precipitate was collected by filtered and dried under reduced pressure to give an electron-donating polymer (d-1) having a constitutional unit represented by the formula (1b-1):

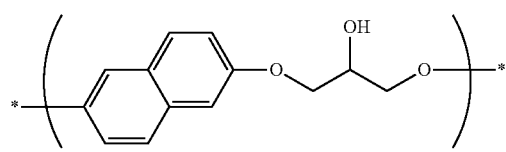

(1b-1)

as a dark reddish-brown solid (1.86 g, yield 94%).

NMR:
$^1$H NMR (400 MHz DMSO-$d_6$) δ: 7.87-7.54 (m, 2H), 7.47-7.02 (m, 4H), 5.54-5.41 (m, 2H), 4.48-3.99 (m, 4H).

FIG. 1 shows a chart of $^1$H NMR of electron-donating polymer (d-1).

GPC:
weight-average molecular weight (Mw)=1.7×10,000
number-average molecular weight (Mn)=5.0×1,000
molecular weight distribution (Mw/Mn)=3.4

Synthetic Example 3: Synthesis of Electron-Donating Polymer (D-1)

After purging the inside of a reaction container with nitrogen, pyridine-sulfur trioxide complex (0.46 g, 2.90 mmol) and dimethyl sulfoxide (3 mL) were successively added to the reaction container. Then, electron-donating polymer (d-1) (0.313 g, 1.45 mmol) obtained in Synthetic Example 2 and triethylamine (1.21 mL, 8.69 mmol) were added to a mixed solvent of dimethyl sulfoxide (3 mL) and dichloromethane (3 mL) and the obtained reaction mixture was added to the reaction container. The reaction mixture was stirred at 20-25° C. for 3 hr while maintaining a nitrogen atmosphere.

Then, the reaction mixture was added to water, the resulting precipitate was recovered, and the recovered precipitate was washed with water. The precipitate was redissolved in dimethyl sulfoxide, and dialysis was performed using a dialysis membrane with molecular weight cutoff 1,000 (Spectra/Por 6, MWCO (Daltons) 1000, manufactured by Spectrum Laboratory) and dimethyl sulfoxide. After dialysis, water was added to the dimethyl sulfoxide solution, the resulting precipitate was recovered, and the solvent in the recovered precipitate was evaporated to give electron-donating polymer (D-1) which is a random copolymer containing a constitutional unit represented by the formula (1a-1) and a constitutional unit represented by the formula (1b-1):

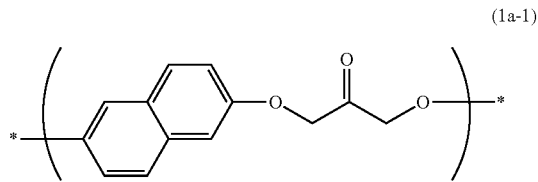

(1a-1)

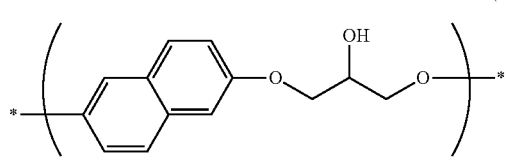

(1b-1)

as a pale-yellow solid (0.313 g, yield 97%). The amount of the constitutional unit (1a-1) in this copolymer is 97 mol per 100 mol of the total of the constitutional unit (1a-1) and the constitutional unit (1b-1).

NMR:
$^1$H NMR (400 MHz DMSO-$d_6$) δ: 7.91-7.50 (m, 2H), 7.48-7.03 (m, 4H), 5.16 (brs, 4H).

Figure 2:
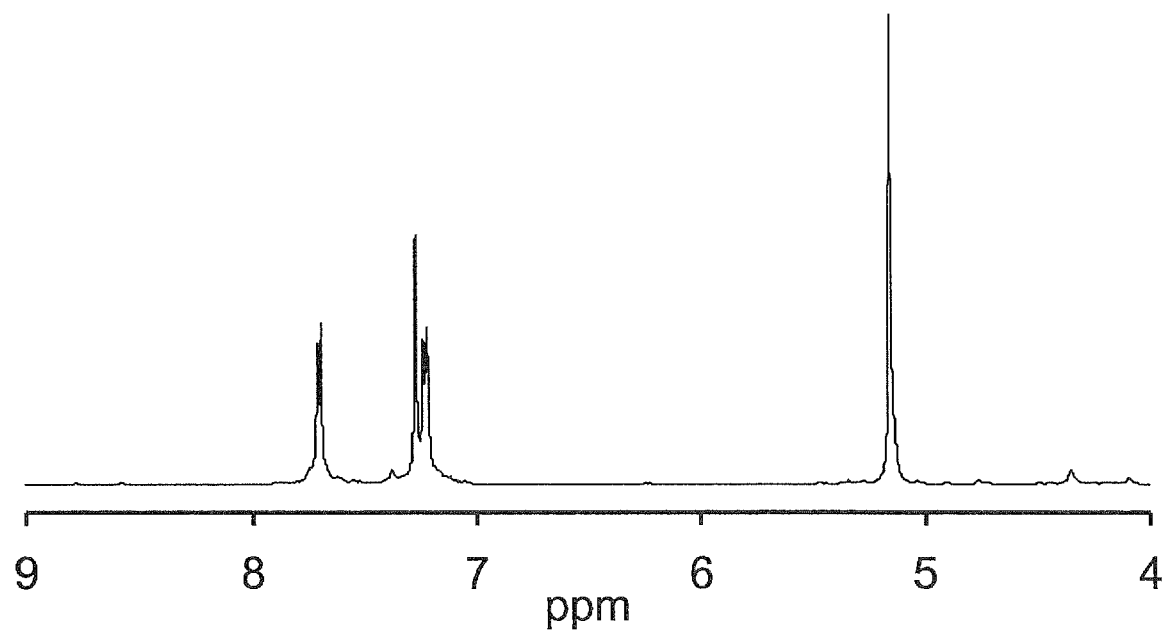
FIG. 2 is a $^1$H NMR chart of electron-donating polymer (D-1) obtained in Synthetic Example 3.

FIG. 2 shows a chart of $^1$H NMR of electron-donating polymer (D-1).

Synthetic Example 4: Synthesis of Electron-Withdrawing Polymer (A-1)

After purging the inside of a reaction container with nitrogen, 4,4'-diamino-2,2'-biphenyldisulfonic acid (10.33 g, 30.0 mmol), m-cresol (75 mL), and triethylamine (7.59 g, 75.0 mmol) were successively added to the reaction container. Then, the reaction mixture was stirred at 140 to 145° C. to dissolve a solid. Thereto were added naphthalene-1,4,5,8-tetracarboxylic dianhydride (8.21 g, 30.6 mmol) and benzoic acid (7.33 g, 60.0 mmol) and the mixture was reacted by stirring at 180 to 185° C. for 20 hr and further at 190 to 195° C. for 5 hr. After completion of the reaction, the reaction mixture was added dropwise to a mixed solvent of methanol and concentrated hydrochloric acid (methanol:concentrated hydrochloric acid=5:1 (volume ratio)) to allow for precipitation, and the precipitate was collected by filtration.

Dimethyl sulfoxide was added to the obtained precipitate, and the mixture was heated at 100 to 110° C. Then, the obtained dimethyl sulfoxide solution was added dropwise to a mixed solvent of methanol and concentrated hydrochloric acid (methanol:concentrated hydrochloric acid=5:1 (volume ratio)) to allow for precipitation, and the precipitate was collected by filtration. The operations of the addition of dimethyl sulfoxide to the obtained precipitate, preparation of dimethyl sulfoxide solution, dropwise addition of dimethyl sulfoxide solution to the aforementioned mixed solvent, and collection by filtration of the precipitated precipitate were performed again.

Dimethyl sulfoxide was added to the obtained precipitate, and the precipitate was heated to 100 to 110° C. The obtained dimethyl sulfoxide solution was dialyzed for 4 days using a dialysis membrane with molecular weight cutoff 3,500 (Spectra/Por 7, MWCO (Daltons) 3500, manufactured by Spectrum Laboratory). After the completion of dialysis, the solution was dried to give an electron-withdrawing polymer (A-1) composed of constitutional units represented by the formula (4a-11):

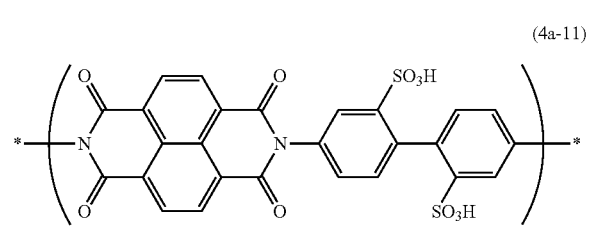

(4a-11)

as a deep-brown solid (12.5 g, yield 70%).
NMR:
$^1$H NMR (500 MHz, DMSO-$d_6$) δ: 9.09-8.51 (br), 8.04 (s), 7.76 (brs), 7.62-7.25 (m).
GPC:
  weight-average molecular weight (Mw)=1.3×100,000
  number-average molecular weight (Mn)=5.9×1,000
  molecular weight distribution (Mw/Mn)=21
Ion Exchange Capacity:
  theoretical ion exchange capacity (theoretical IEC) 3.47 (mmol/g)
  ion exchange capacity (IEC) by titration=3.47 (mmol/g)

Synthetic Example 5: Synthesis of Electron-Withdrawing Polymer (A-2)

After purging the inside of a reaction container with nitrogen, 4,4'-diamino-2,2'-biphenyldisulfonic acid (4.14 g, 12.0 mmol), 4,4'-diaminooctafluorobiphenyl (0.44 g, 1.3 mmol), m-cresol (38 g), and triethylamine (3.38 g, 33.4 mmol) were successively added to the reaction container. Then, the reaction mixture was stirred at 140 to 145° C. to dissolve a solid, and naphthalene-1,4,5,8-tetracarboxylic dianhydride (3.65 g, 13.6 mmol), and benzoic acid (3.27 g, 26.8 mmol) were added. The reaction mixture was reacted by stirring at 170 to 175° C. for 27 hr. After completion of the reaction, the reaction mixture was added dropwise to a mixed solvent of methanol and concentrated hydrochloric acid (methanol:concentrated hydrochloric acid=5:1 (volume ratio)) to allow for precipitation. The precipitate was collected by filtered and the obtained precipitate was added to dimethyl sulfoxide and dissolved by heating at 100 to 110° C. to give a dimethyl sulfoxide solution.

Then, the obtained dimethyl sulfoxide solution was added dropwise to a mixed solvent of methanol and concentrated hydrochloric acid (methanol:concentrated hydrochloric acid=5:1 (volume ratio)) to allow for precipitation, and the precipitate was collected by filtration. Dimethyl sulfoxide was added to the precipitate and the precipitate was dissolved by heating at 100 to 110° C. The dimethyl sulfoxide solution was added dropwise to methanol to allow for precipitation, and the precipitate was collected by filtration. Dimethyl sulfoxide was added to the precipitate and the precipitate was dissolved by heating at 100 to 110° C. The obtained dimethyl sulfoxide solution was dialyzed for 4 days using dialysis membrane with molecular weight cutoff 1,000 (Spectra/Por 6, MWCO (Daltons) 1000, manufactured by Spectrum Laboratory). After completion of the dialysis, the solution was freeze-dried to give an electron-withdrawing polymer (A-2) which is a random copolymer having a constitutional unit represented by the formula (4a-11) and a constitutional unit represented by the formula (4b-11):

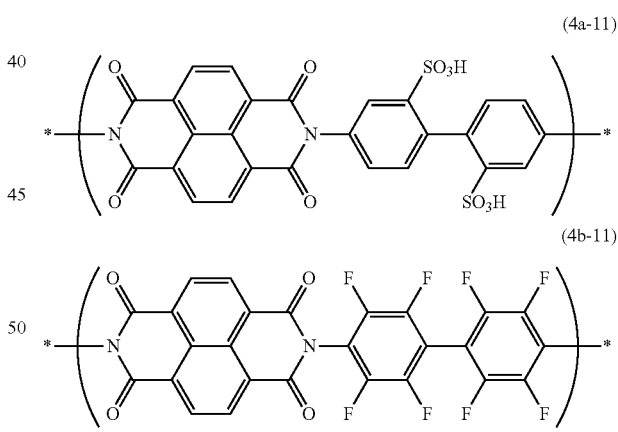

(4a-11)

(4b-11)

as a deep brown solid (5.4 g, yield 70%). The number of constitutional unit (4a-11)/number of constitutional unit (4b 11) in the electron-withdrawing polymer (A-2), which is calculated from the charged amount of the material, is 9/1.
$^1$H NMR (400 MHz, DMSO-$d_6$)
  δ: 8.81 (brs), 8.06 (s), 7.78 (brs), 7.43 (brs).
GPC:
  weight-average molecular weight (Mw)=7.5×10,000
  number-average molecular weight (Mn)=1.6×10,000
  molecular weight distribution (Mw/Mn)=4.7
IEC:
  theoretical ion exchange capacity (IEC)=3.13 (meq/g)

Example 1: Production of Membrane of Composition (I) of Electron-Donating Polymer (D-1) and Electron-Withdrawing Polymer (A-1)

The electron-donating polymer (D-1) (74.3 mg), electron-withdrawing polymer (A-1) (13.8 mg) and dimethyl sulfoxide (2 mL) were successively added to a glass container. Then, the polymer mixture was subjected to ultrasonication while heating to 60° C.-80° C. to prepare a solution. The obtained solution was added to a petri dish with diameter 4 cm, the petri dish was placed on a hot plate set to 60° C., and dimethyl sulfoxide was evaporated. Then, the petri dish was placed on a vacuum dryer, and dried under reduced pressure at 60° C. for 24 hr to give a membrane of composition (I) of the electron-donating polymer (D-1) and the electron-withdrawing polymer (A-1) (light-brown transparent, membrane thickness: 11 μm).

Membrane of Composition (I)

theoretical ion exchange capacity (theoretical IEC) 2.94 (mmol/g)

ion exchange capacity (IEC) by titration=2.90 (mmol/g)

Examples 2 and 3: Production of Membranes of Compositions (II) and (III) of Electron-Donating Polymer (D-1) and Electron-Withdrawing Polymer (A-1)

In the same manner as in Example 1 except that the ratio of the electron-donating polymer (D-1) and the electron-withdrawing polymer (A-1) was changed, membranes of compositions (II) and (III) were produced.

Membrane of Composition (II)

theoretical ion exchange capacity (theoretical IEC)=2.64 (mmol/g)

ion exchange capacity (IEC) by titration=2.67 (mmol/g)

Membrane of Composition (III)

theoretical ion exchange capacity (theoretical IEC)=2.34 (mmol/g)

ion exchange capacity (IEC) by titration=2.31 (mmol/g)

Table 1 shows the amounts of the electron-donating polymer (D-1) and the electron-withdrawing polymer (A-1) in the membranes of the compositions (I) to (III) obtained in Examples 1 to 3, as well as the membrane thickness thereof.

Table 1 also shows molar ratio of naphthalene tetracarboxylic acid diimide part (a) of the electron-withdrawing polymer (A-1) and dioxynaphthalene part (d) of the electron-donating polymer (D-1) in the composition (=number (mol) of naphthalene tetracarboxylic acid diimide part (a)/number (mol) of dioxynaphthalene part (d)). In the present specification, the molar ratio is sometimes abbreviated as "molar ratio of (A-1)/(D-1)".

Also, Table 1 shows molar fraction (%) of naphthalene tetracarboxylic acid diimide part (a) relative to the total of naphthalene tetracarboxylic acid diimide part (a) of the electron-withdrawing polymer (A-1) and dioxynaphthalene part (d) of the electron-donating polymer (D-1) in the composition (=[(number (mol) of naphthalene tetracarboxylic acid diimide part (a))/{number (mol) of naphthalene tetracarboxylic acid diimide part (a))+(number (mol) of dioxynaphthalene part (d))}]×100). In the present specification, the molar fraction is sometimes abbreviated as "molar fraction of (A-1)".

TABLE 1

| Example | composition | (A-1) amount (mg) | (D-1) amount (mg) | (A-1)/(D-1) molar ratio | (A-1) molar fraction (%) | membrane thickness (μm) |
| --- | --- | --- | --- | --- | --- | --- |
| 1 | (I) | 74.3 | 13.8 | 1/0.5 | 67 | 11 |
| 2 | (II) | 67.9 | 20.2 | 1/0.8 | 56 | 13 |
| 3 | (III) | 59.3 | 28.7 | 1/1.3 | 43 | 14 |

Example 4: Production of Membrane of Heat-Treated Composition (IV)

The membrane of the composition (I) obtained in Example 1 was placed in a glass vacuum desiccator with a cock, and the inside of the desiccator was purged with nitrogen gas. Then, the vacuum desiccator was dried under reduced pressure in a constant-temperature dryer set to 120° C. for 16 hr to give a membrane of heat-treated composition (IV) (dark-brown, membrane thickness 11 μm).

Membrane of Heat-Treated Composition (IV):

ion exchange capacity (IEC) by titration=2.81 (mmol/g)

Examples 5 and 6: Production of Membranes of Heat-Treated Compositions (V) and (VI)

In the same manner as in Example 4 except that the membrane of composition (II) or (III) obtained in Example 2 or 3 was used instead of the membrane of composition (I) obtained in Example 1, the membranes of heat-treated compositions (V) and (VI) were produced.

Membrane of Heat-Treated Composition (V):

ion exchange capacity (IEC) by titration=2.40 (mmol/g)

Membrane of Heat-Treated Composition (VI):

ion exchange capacity (IEC) by titration=2.21 (mmol/g)

Table 2 shows the heat-treated compositions obtained in Examples 4 to 6 and the starting compositions used for the heat treatment.

Table 2 also shows a decrease ratio of ion exchange capacity due to heat treatment (indicated as "IEC decrease ratio" in the following Table) which was calculated from the ion exchange capacity by titration of the starting composition used for heat treatment (hereinafter to be indicated as "IEC(1)") and the ion exchange capacity by titration of the obtained heat-treated composition (hereinafter to be indicated as "IEC(2)"), and according to the following formula:

decrease ratio (%) of ion exchange capacity due to heat treatment=100×{IEC(1)−IEC(2)}/IEC(1)

TABLE 2

| Example | heat-treated composition | starting composition | IEC decrease ratio (%) |
| --- | --- | --- | --- |
| 4 | (IV) | (I) | 3 |
| 5 | (V) | (II) | 10 |
| 6 | (VI) | (III) | 4 |

Comparative Example 1: Production of Membrane of Composition (VII) of Electron-Donating Polymer (d-1) and Electron-Withdrawing Polymer (A-1)

Electron-donating polymer (d-1) (74.1 mg), electron-withdrawing polymer (A-1) (13.9 mg) and dimethyl sulfoxide (2 mL) were successively added to a glass container. The polymer mixture was subjected to ultrasonication while heating to 60° C.-80° C. to produce a solution. The obtained solution was added to a petri dish with diameter 4 cm, the petri dish was placed on a hot plate set to 60° C., and dimethyl sulfoxide was evaporated. Then, the petri dish was placed on a vacuum dryer, and dried under reduced pressure at 60° C. for 24 hr to give a membrane of composition (III) of the electron-donating polymer (d-1) and the electron-withdrawing polymer (A-1) (yellow transparent, membrane thickness: 11 μm).

Membrane of Composition (VII)
 theoretical ion exchange capacity (theoretical IEC)=2.92 (mmol/g)
 ion exchange capacity (IEC) by titration=2.90 (mmol/g)

Comparative Examples 2 and 3: Production of Membranes of Compositions (VIII) and (IX) of Electron-Donating Polymer (d-1) and Electron-Withdrawing Polymer (A-1)

In the same manner as in Comparative Example 1 except that the ratio of the electron-donating polymer (d-1) and the electron-withdrawing polymer (A-1) was changed, the membranes of compositions (VIII) and (IX) were produced.

Membrane of Composition (VIII)
 theoretical ion exchange capacity (theoretical IEC)=3.34 (mmol/g)
 ion exchange capacity (IEC) by titration=3.33 (mmol/g)

Membrane of Composition (IX)
 theoretical ion exchange capacity (theoretical IEC)=3.41 (mmol/g)
 ion exchange capacity (IEC) by titration=3.38 (mmol/g)

Table 3 shows the amounts of electron-donating polymer (d-1) and electron-withdrawing polymer (A-1) in the membranes of compositions (VII) to (IX) obtained in Comparative Examples 1 to 3 and the membrane thickness.

Table 3 also shows molar ratio of naphthalene tetracarboxylic acid diimide part (a) of the electron-withdrawing polymer (A-1) and dioxynaphthalene part (d) of the electron-donating polymer (d-1) in the composition (=number (mol) of naphthalene tetracarboxylic acid diimide part (a)/number (mol) of dioxynaphthalene part (d)). In the present specification, the molar ratio is sometimes abbreviated as "molar ratio of (A-1)/(d-1)".

Also, Table 3 shows molar fraction (%) of naphthalene tetracarboxylic acid diimide part (a) relative to the total of naphthalene tetracarboxylic acid diimide part (a) of the electron-withdrawing polymer (A-1) and dioxynaphthalene part (d) of the electron-donating polymer (d-1) in the composition (=[(number (mol) of naphthalene tetracarboxylic acid diimide part (a))/{(number (mol) of naphthalene tetracarboxylic acid diimide part (a))+(number (mol) of dioxynaphthalene part (d))}]×100). In the present specification, the molar fraction is sometimes abbreviated as "molar fraction of (A-1)".

TABLE 3

| Comparative Example | composition | (A-1) amount (mg) | (d-1) amount (mg) | (A-1)/(d-1) molar ratio | (A-1) molar fraction (%) | membrane thickness (μm) |
|---|---|---|---|---|---|---|
| 1 | (VII) | 74.1 | 13.9 | 1/0.5 | 67 | 11 |
| 2 | (VIII) | 84.9 | 3.2 | 1/0.1 | 91 | 14 |
| 3 | (IX) | 86.4 | 1.6 | 1/1.05 | 95 | 14 |

Comparative Example 4: Production of Membrane of Heat-Treated Composition (X)

The membrane of the composition (VII) obtained in Comparative Example 1 was placed in a glass vacuum desiccator with a cock, and the inside of the desiccator was purged with nitrogen gas. Then, the vacuum desiccator was stood in a constant-temperature dryer set to 150° C. for 50 hr to give a membrane of heat-treated composition (X) (dark brown, membrane thickness 11 μm).

Membrane of Composition (X):
 ion exchange capacity (IEC) by titration=1.65 mmol/g)

Comparative Examples 5 and 6: Production of Membranes of Heat-Treated Compositions (XI) and (XII)

In the same manner as in Comparative Example 1 except that the membrane of the composition (VIII) or (IX) obtained in Comparative Example 2 or 3 was used instead of the membrane of the composition (VIII) obtained in Comparative Example 4, membranes of heat-treated compositions (XIX) and (XX) were produced.

Membrane of Heat-Treated Composition (XI) (Dark-Brown Transparent, Membrane Thickness 14 μm):
 ion exchange capacity (IEC) by titration=2.22 mmol/g)

Membrane of Heat-Treated Composition (XII) (Dark-Brown Transparent, Membrane Thickness 14 μm):
 ion exchange capacity (IEC) by titration=2.51 (mmol/g)

Table 4 shows heat-treated compositions obtained in Comparative Examples 4 to 6, starting compositions used for the heat treatment, and a decrease ratio of ion exchange capacity due to the heat treatment as calculated according to the above-mentioned formula.

TABLE 4

| Comparative Example | heat-treated composition | starting composition | IEC decrease ratio (%) |
|---|---|---|---|
| 4 | (X) | (VII) | 43 |
| 5 | (XI) | (VIII) | 33 |
| 6 | (XII) | (IX) | 25 |

As shown in the decrease ratio of ion exchange capacity (IEC decrease ratio) due to the heat treatment as shown in Tables 2 and 4, the compositions (I) to (III) containing electron-donating polymer (D-1) show a suppressed decrease in the ion exchange capacity due to the heat treatment, as compared to the compositions (IV) to (VI) containing electron-donating polymer (d-1).

Comparative Example 7: Production of Membrane of Heat-Treated Composition (XIII)

The membrane of the composition (VII) obtained in Comparative Example 1 was placed in a glass vacuum desiccator with a cock, and the inside of the desiccator was purged with nitrogen gas. Then, the vacuum desiccator was dried under reduced pressure in a constant-temperature dryer set to 120° C. for 16 hr to give a membrane of heat-treated composition (XIII) (dark-brown, membrane thickness 17 μm).

Example 7: Production of Composition (XIV) Containing Electron-Donating Polymer (D-1) and Electron-Withdrawing Polymer (A-2)

The electron-withdrawing polymer (A-2) (32.8 mg) and dimethylformamide (3 mL) were successively added to a sample bottle. Then, the obtained mixture was stirred and heated at 80-90° C. to give a solution. Then, to the obtained dimethylformamide solution of electron-withdrawing polymer (A-2) was added electron-donating polymer (D-1) (6.11 mg), and water (0.5 mL) and ethanol (2.5 mL) were further added to give composition (XIV) containing electron-donating polymer (D-1) and electron-withdrawing polymer (A-2).

Experimental Example 1: Confirmation 1 of Charge-Transfer Complex

The absorption spectrum of the membrane of the composition (I) obtained Example 1 and the membrane of the heat-treated composition (IV) obtained in Example 4 was measured by ultraviolet-visible spectroscopy (UV-vis). These absorption spectra are shown in FIG. 3.

Figure 3:
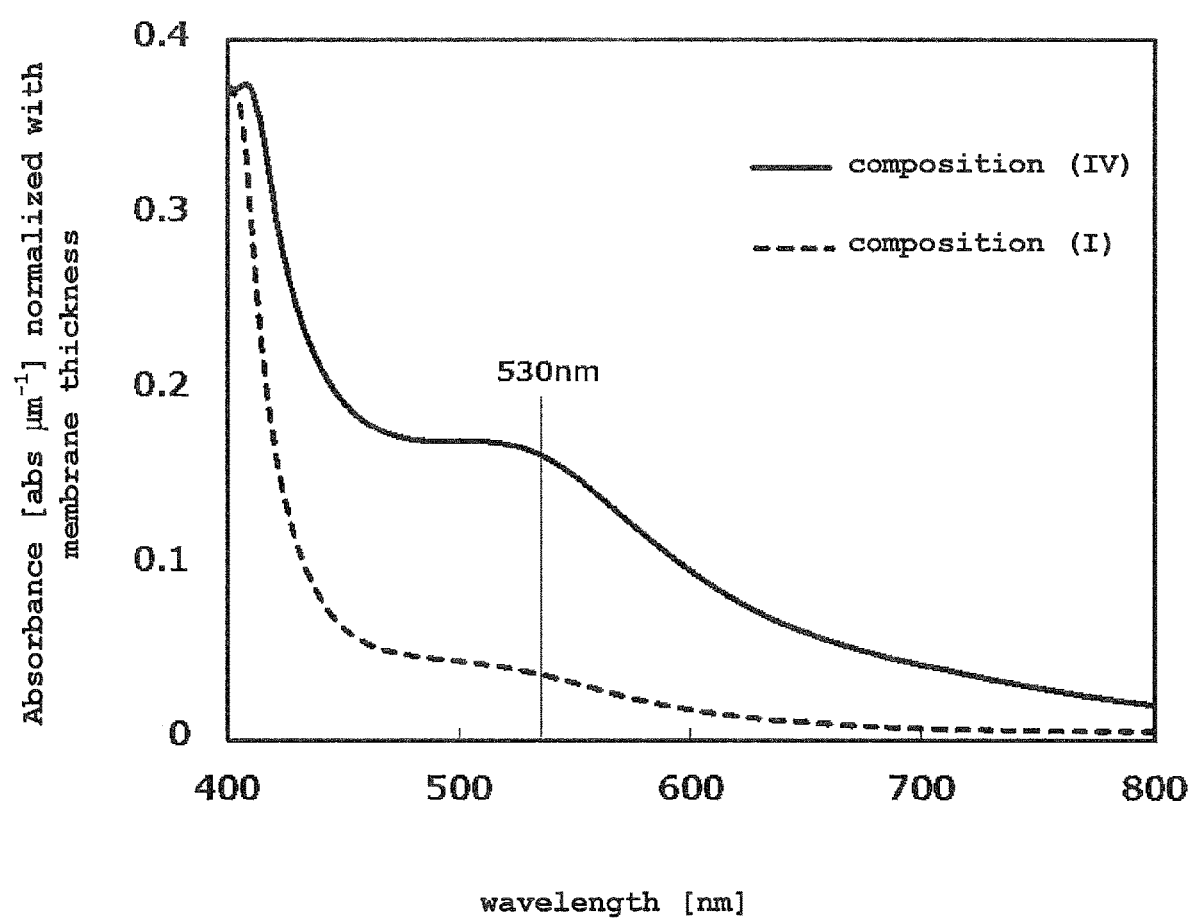
FIG. 3 shows absorption spectrum of the membrane of composition (I) (Example 1) and the membrane of heat-treated composition (IV) (Example 4) by ultraviolet-visible spectroscopy (UV-vis) measured in Experimental Example 1.

As shown in FIG. 3, the absorption spectra of the membranes of the composition (I) and the heat-treated composition (IV) had a shoulder at around 530 nm. This shoulder shows absorption by a charge-transfer complex (see Nature, 375(6529), 303-305 (1995) and Polym. J. (2013), 45, 839-844). Therefore, from the results, it was confirmed that the membranes of the composition (I) and the heat-treated composition (IV) formed a charge-transfer complex.

The absorbance at 530 nm which was normalized with a membrane thickness was about 4 times higher in the membrane of heat-treated composition (IV) than in the membrane of composition (I). From this result, it was confirmed that a heat treatment increases the formation amount of a charge-transfer complex.

Absorbance Value (Abs/μm) at 530 nm Normalized with Membrane Thickness:
  composition (I)=0.039 (abs/μm)
  heat-treated composition (IV)=0.166 (abs/μm)

Experimental Example 2: Confirmation 2 of Charge-Transfer Complex

The absorption spectrum of the membrane of the composition (VII) obtained Comparative Example 1 and the membrane of the heat-treated composition (XIII) obtained in Comparative Example 7 was measured by ultraviolet-visible spectroscopy (UV-vis). These absorption spectra are shown in FIG. 4.

Figure 4:
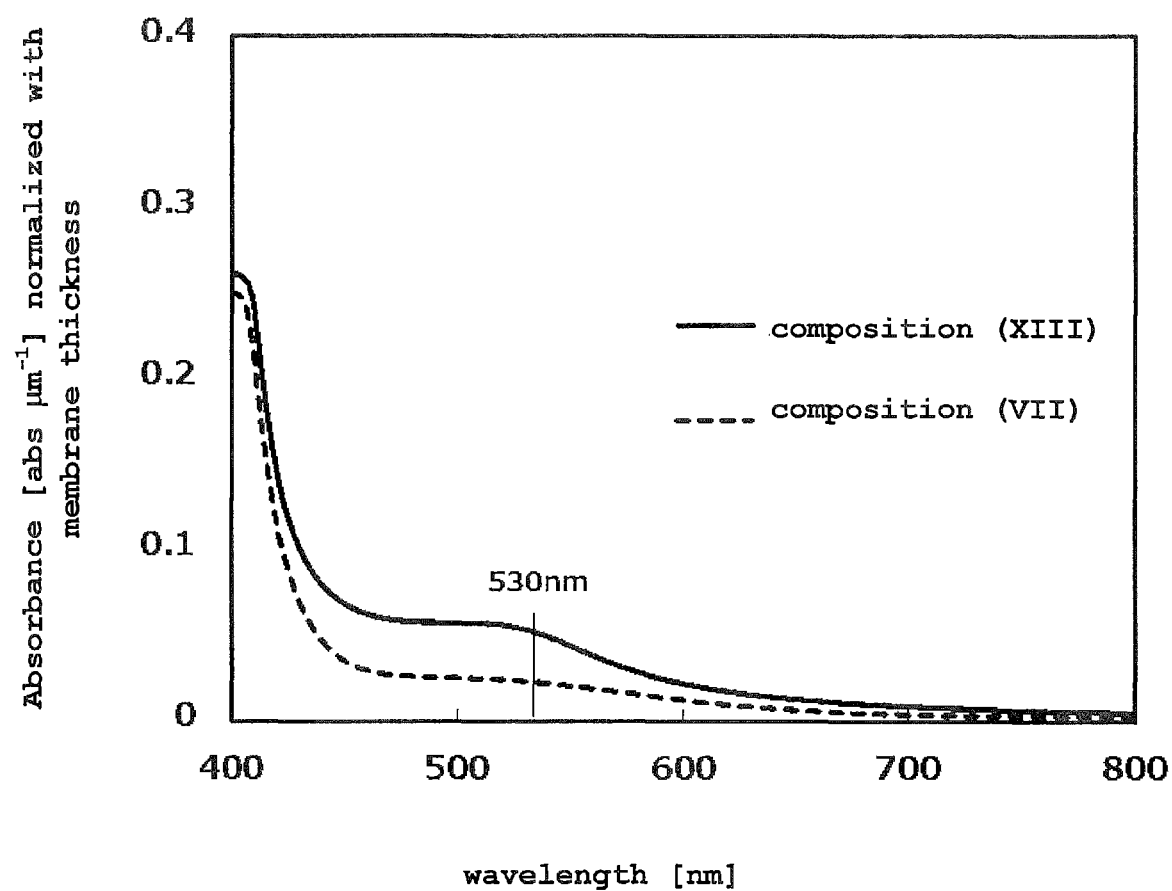
FIG. 4 shows absorption spectrum of the membrane of composition (VII) (Comparative Example 1) and the membrane of heat-treated composition (XIII) (Comparative Example 7) by ultraviolet-visible spectroscopy (UV-vis) measured in Experimental Example 2.

As shown in FIG. 4, the absorption spectra of the membranes of the composition (VII) and the heat-treated composition (XIII) had a shoulder at around 530 nm, and it was confirmed that a charge-transfer complex was formed.

The absorbance at 530 nm which was normalized with a membrane thickness was about 2 times higher in the membrane of heat-treated composition (XIII) than in the membrane of composition (VII).

Absorbance Value (Abs/μm) at 530 nm Normalized with Membrane Thickness:
  composition (VII)=0.023 (abs/μm)
  heat-treated composition (XIII)=0.054 (abs/μm)

As shown in the results of Experimental Examples 1 and 2, the absorbance at 530 nm which was normalized with membrane thickness was about 1.7 times higher in the membrane of composition (I) containing electron-donating polymer (D-1) (Example 1) than in the membrane of composition (VII) containing electron-donating polymer (d-1) (Comparative Example 1). From this result, it was confirmed that the formation amount of a charge-transfer complex before a heat treatment increased when electron-donating polymer (D-1) was used than when electron-donating polymer (d-1) was used.

In addition, the absorbance at 530 nm which was normalized with membrane thickness was about 3 times higher in the heat-treated composition (IV) (Example 4) than in the heat-treated composition (XIII) (Comparative Example 7). From this result, it was confirmed that the formation amount of a charge-transfer complex after a heat treatment increased when electron-donating polymer (D-1) was used than when electron-donating polymer (d-1) was used.

Experimental Example 3: Power Generation Test 1 of Fuel Cell

Using the membranes of heat-treated composition (IV) (membrane thickness: 14 μm) produced in the same manner as in Example 4 as an electrolyte membrane, MEA having a three-layer structure of GDL/CCM/GDL was produced as described in the aforementioned MEA preparation condition A. Using the MEA, a power generation test of fuel cell was performed under test condition A. The OCV of a single cell in the power generation test 1 of fuel cell was 0.910 V. The cell resistance value of the membranes of the heat-treated composition (IV) was 0.17Ω. The results of the voltage and current density in the power generation test 1 are shown in Table 5.

TABLE 5

| current density (A/cm$^2$) | voltage (V) |
|---|---|
| 0.10 | 0.67 |
| 0.20 | 0.60 |
| 0.40 | 0.50 |
| 0.60 | 0.40 |
| 0.80 | 0.32 |
| 1.00 | 0.20 |
| 1.10 | 0.12 |

Experimental Example 4: Power Generation Test 2 of Fuel Cell

In the same manner as in Experimental Example 3 except that the aforementioned test condition A was changed to the aforementioned test condition B, a power generation test of fuel cell was performed. The cell resistance value of the membrane of the heat-treated composition (IV) was 1.38Ω. The results of the voltage and current density in the power generation test 2 are shown in Table 6.

TABLE 6

| current density (A/cm$^2$) | voltage (V) |
|---|---|
| 0.05 | 0.63 |
| 0.10 | 0.51 |
| 0.20 | 0.28 |
| 0.30 | 0.19 |

Experimental Example 5: Power Generation Test 3 of Fuel Cell

Using catalyst ink containing composition (XIV), MEA having a three-layer structure of GDL/CCM/GDL was produced as described in the aforementioned MEA preparation condition B. The catalyst layer of the MEA contains the composition of the present invention (i.e., electron-donating polymer (D-1) and electron-withdrawing polymer (A-2)). Using the MEA, a power generation test of fuel cell was performed under test condition A. The results of the voltage and current density are shown in Table 7. As shown in Table 7, it was confirmed that power can be generated using the catalyst layer containing the composition of the present invention. The OCV of a single cell in the power generation test 3 of fuel cell was 0.873 V.

TABLE 7

| current density (A/cm$^2$) | voltage (V) |
|---|---|
| 0.10 | 0.66 |
| 0.20 | 0.59 |
| 0.30 | 0.53 |
| 0.40 | 0.48 |
| 0.50 | 0.43 |
| 0.60 | 0.38 |
| 0.70 | 0.33 |
| 0.80 | 0.28 |
| 1.00 | 0.11 |

INDUSTRIAL APPLICABILITY

The composition of the present invention is useful as, for example, an electrolyte material of a fuel cell (e.g., polymer electrolyte, electrolyte membrane etc. used for forming a catalyst layer).

This application is based on a patent application No. 2018-022183 filed in Japan, the contents of which are incorporated in full herein.

The invention claimed is:

1. A composition comprising an electron-donating polymer (D) and an electron-withdrawing polymer (A), wherein the electron-donating polymer (D) has a constitutional unit represented by the formula (1a):

  (1a)

wherein $X^{1a}$ is a divalent group represented by the formula (2a) or the formula (2b):

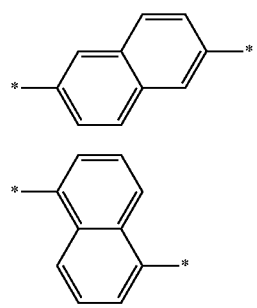

wherein * is a bonding position,
$Y^{1a}$ is a divalent group represented by the formula (3a):

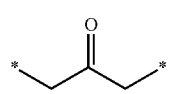  (3a)

wherein * is a bonding position, and
* is a bonding position, and
the electron-withdrawing polymer (A) has a constitutional unit represented by formula (4a):

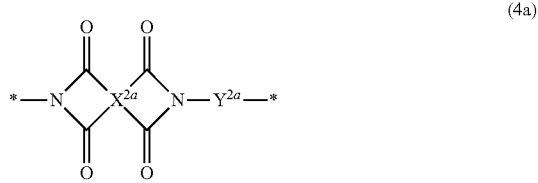  (4a)

wherein $X^{2a}$ is a tetravalent group represented by any of the formula (5a) to the formula (5c):

  (5a)

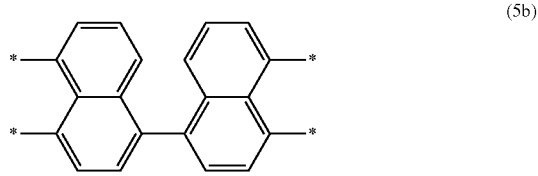  (5b)

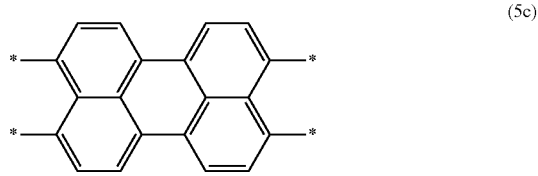  (5c)

wherein * is a bonding position,
$Y^{2a}$ is a divalent group represented by any of the formula (6a) to the formula (9a):

  (6a)

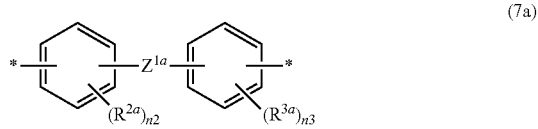  (7a)

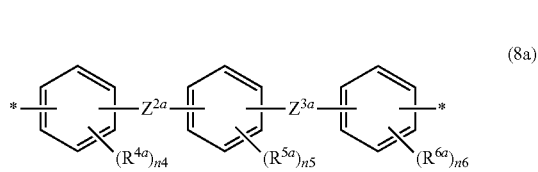  (8a)

-continued (9a)

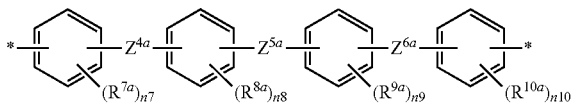

wherein n1 is an integer of 1-4,
n2-n10 are each independently an integer of 0-4,
$R^{1a}$-$R^{10a}$ are each independently a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, a sulfo group, a phenyl group optionally substituted by $W^{1a}$, a thienyl group optionally substituted by $W^{1a}$, or a furyl group optionally substituted by $W^{1a}$,
$W^{1a}$ is a $C_{1-10}$ alkyl group optionally substituted by a halogen atom, a $C_{1-10}$ alkoxy group optionally substituted by a halogen atom, a hydroxy group, a halogen atom, a nitro group, a formyl group, a cyano group, or a sulfo group,
when n1 to n10 are each an integer of 2 to 4, plural $R^{1a}$ to $R^{10a}$ are optionally the same as or different from each other,
at least one of $R^{1a}$ in the number of n1 is a sulfo group,
at least one selected from the group consisting of $R^{2a}$ in the number of n2 and $R^{3a}$ in the number of n3 is a sulfo group,
at least one selected from the group consisting of $R^{4a}$ in the number of n4, $R^{5a}$ in the number of n5 and $R^{6a}$ in the number of n6 is a sulfo group,
at least one selected from the group consisting of $R^{7a}$ in the number of n7, $R^{8a}$ in the number of n8, $R^{9a}$ in the number of n9 and $R^{10a}$ in the number of n10 is a sulfo group,
$Z^{1a}$-$Z^{6a}$ are each independently a single bond, a $C_{1-2}$ alkylene group optionally substituted by a halogen atom, a $C_{3-10}$ alkylene group, sulfonyl group, a carbonyl group, *—CONH—*, *—NHCO—*, *—C($R^{11a}$)($R^{12a}$)—*, or an oxy group,
$R^{11a}$ and $R^{12a}$ are each independently a $C_{1-3}$ alkyl group optionally substituted by a halogen atom, or $R^{11a}$ and $R^{12a}$ are bonded to each other to form a $C_{3-6}$ hydrocarbon ring together with a carbon atom bonded thereto, and
\* is a bonding position, and
\* is a bonding position.

2. The composition according to claim 1, wherein $X^{1a}$ is a divalent group represented by the formula (2a).

3. The composition according to claim 1, wherein the electron-donating polymer (D) further has a constitutional unit represented by the formula (1b):

*—O—$X^{1b}$—O—$Y^{1b}$—*  (1b)

wherein $X^{1b}$ is a divalent group represented by the formula (2a) the formula (2b):

(2a)

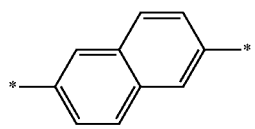

(2b)

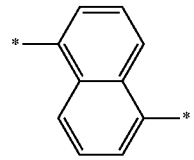

wherein \* is a bonding position,
$Y^{1b}$ is a divalent group represented by the formula (3b):

(3b)

wherein \* is a bonding position, and
\* is a bonding position.

4. The composition according to claim 3, wherein $X^{1b}$ is a divalent group represented by the formula (2a).

5. The composition according to claim 3, wherein an amount of the constitutional unit represented by the formula (1a) is 80-98 mol per 100 mol of the total of the constitutional unit represented by the formula (1a) and the constitutional unit represented by and the formula (1b).

6. The composition according to claim 1, wherein $R^{1a}$-$R^{10a}$ are each independently a $C_{1-10}$ alkyl group optionally substituted by a halogen atom, a $C_{1-10}$ alkoxy group optionally substituted by a halogen atom, a halogen atom, a nitro group, a formyl group, a cyano group, a sulfo group, a phenyl group optionally substituted by $W^{1a}$, a thienyl group optionally substituted by $W^{1a}$, or a furyl group optionally substituted by $W^{1a}$, and $W^{1a}$ is a $C_{1-10}$ alkyl group optionally substituted by a halogen atom, a $C_{1-10}$ alkoxy group optionally substituted by a halogen atom, a halogen atom, a nitro group, a formyl group, a cyano group or a sulfo group.

7. The composition according to claim 1, wherein $X^{2a}$ is a tetravalent group represented by the formula (5a).

8. The composition according to claim 1, wherein $Y^{2a}$ is a divalent group represented by the formula (7a).

9. The composition according to claim 1, wherein the constitutional unit represented by the formula (4a) is a constitutional unit represented by the formula (4a-1):

(4a-1)

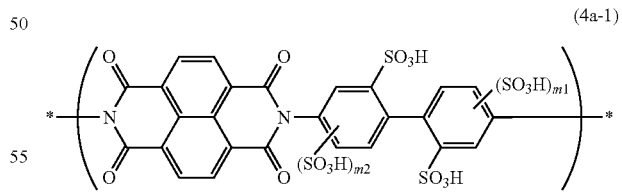

wherein m1 and m2 are each independently an integer of 0-3, and
\* is a bonding position.

10. The composition according to claim 1, wherein the electron-donating polymer (D) and the electron-withdrawing polymer (A) form a charge-transfer complex.

\* \* \* \* \*